United States Patent
Yabuki et al.

(10) Patent No.: US 9,985,696 B2
(45) Date of Patent: *May 29, 2018

(54) INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

(71) Applicant: Nintendo Co., Ltd., Kyoto (JP)

(72) Inventors: Kosuke Yabuki, Kyoto (JP); Yusuke Shiraiwa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/403,729

(22) Filed: Jan. 11, 2017

(65) Prior Publication Data

US 2017/0126287 A1 May 4, 2017

Related U.S. Application Data

(63) Continuation of application No. 14/842,142, filed on Sep. 1, 2015, now Pat. No. 9,577,717.

(30) Foreign Application Priority Data

Jan. 14, 2015 (JP) .................. 2015-004740

(51) Int. Cl.
*H04B 5/00* (2006.01)
*H04M 15/00* (2006.01)
(Continued)

(52) U.S. Cl.
CPC ......... *H04B 5/0062* (2013.01); *A63F 13/327* (2014.09); *A63F 13/35* (2014.09);
(Continued)

(58) Field of Classification Search
CPC ............................ H04B 5/0062; H04W 4/008
See application file for complete search history.

(56) References Cited

U.S. PATENT DOCUMENTS

2009/0037526 A1   2/2009  Elliott et al.
2013/0296058 A1*  11/2013 Leyland .................. A63F 13/95
                                                        463/42
(Continued)

FOREIGN PATENT DOCUMENTS

EP    1 475 134 A2    11/2004
EP    1 475 134 A3    12/2004
(Continued)

OTHER PUBLICATIONS

Report of Reconsideration by Examiner before Appeal, draft date May 12, 2017, issued in Japanese Patent Application No. 2015-004740 and English translation.
(Continued)

*Primary Examiner* — Tuan H Nguyen
(74) *Attorney, Agent, or Firm* — Nixon & Vanderhye P.C.

(57) ABSTRACT

Based on data acquired from a server via a predetermined network, a predetermined content is acquired. Further, based on data acquired from an information storage medium by performing near field communication with the information storage medium, a content that can be used in the same application as an application in which a content that can be acquired from the server via the predetermined network is used, or the same content is acquired.

20 Claims, 11 Drawing Sheets

(51) Int. Cl.
   *H04W 4/00* (2018.01)
   *A63F 13/327* (2014.01)
   *A63F 13/35* (2014.01)
   *A63F 13/69* (2014.01)
   *A63F 13/73* (2014.01)
   *A63F 13/792* (2014.01)
   *A63F 13/95* (2014.01)
   *H04L 29/06* (2006.01)

(52) U.S. Cl.
   CPC ............ *A63F 13/69* (2014.09); *A63F 13/73* (2014.09); *A63F 13/792* (2014.09); *A63F 13/95* (2014.09); *H04M 15/93* (2013.01); *H04W 4/008* (2013.01); *H04L 67/42* (2013.01)

(56) References Cited

U.S. PATENT DOCUMENTS

2014/0256430 A1  9/2014  Matsumura
2014/0289050 A1  9/2014  Numata

FOREIGN PATENT DOCUMENTS

| EP | 1 625 880 A1 | 2/2006 |
|---|---|---|
| JP | 2002-92247 A | 3/2002 |
| JP | 2002-342290 A | 11/2002 |
| JP | 2008-114084 A | 5/2008 |
| JP | 2009-78132 A | 4/2009 |
| JP | 5581434 B1 | 8/2014 |
| JP | 2014-171678 A | 9/2014 |
| JP | 2014-183956 A | 10/2014 |
| KR | 10-2014-0110706 A | 9/2014 |
| WO | 2014/137200 A1 | 9/2014 |

OTHER PUBLICATIONS

"Let's Enjoy Downloadable Contents," Official Guidebook of Metal Max 4: Gekko no Diva, KADOKAWA Corporation, Feb. 4, 2014, 1st ed., pp. 4, 5, 9-13, and 32.

New Elements in 'Everybody's Golf 6,' Official Guidebook of Everybody's Golf 6 Extended and Revised Edition, Enterbrain Inc., Jan. 9, 2013, 1st ed., pp. 28, 30, 146, and 147.

"Super Smash Bros. for Wii U' Report of Hand-on Experience," Game Watch, Nov. 7, 2014, 9 pages.

Notice of Reasons for Refusal dated Sep. 5, 2017, issued in Japanese Patent Application No. 2015-4740.

* cited by examiner

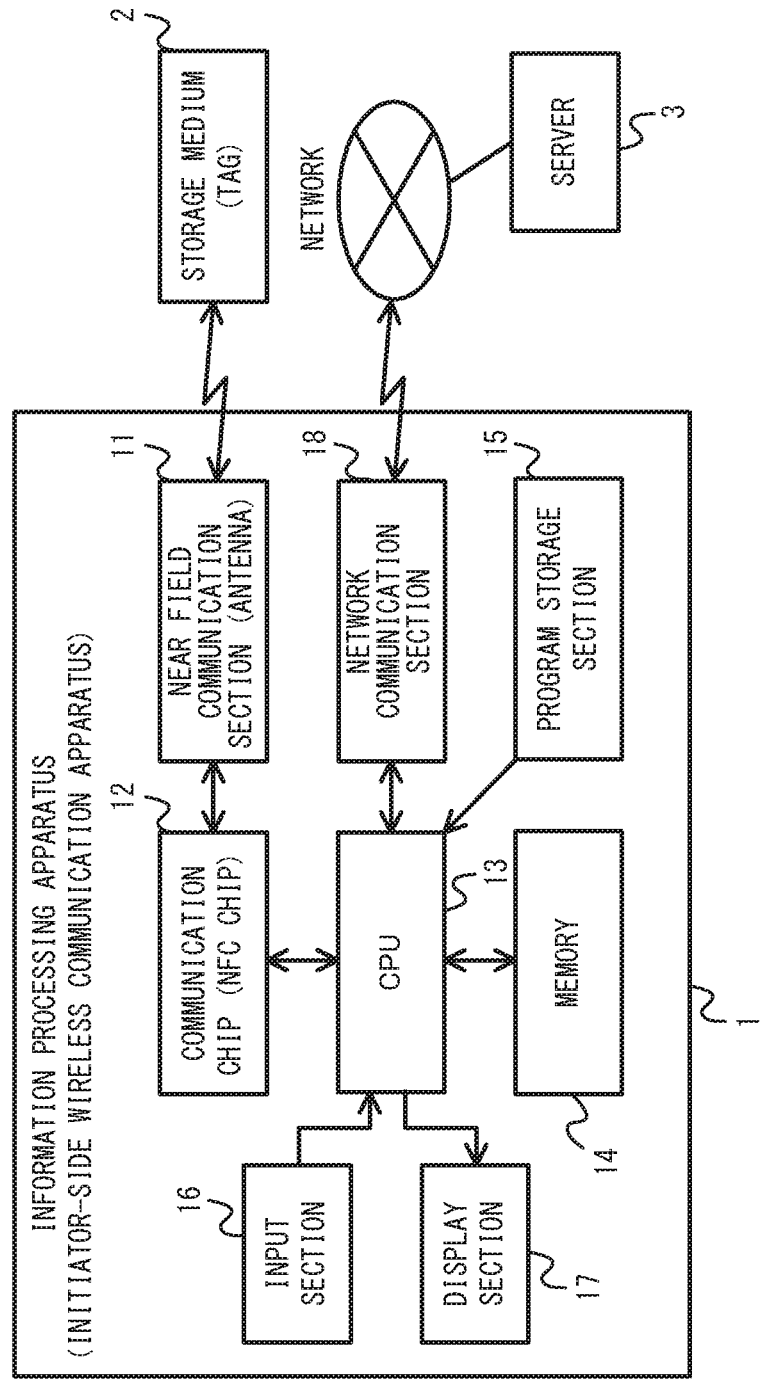
F I G. 1

INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

CROSS REFERENCE TO RELATED APPLICATIONS

This application is a continuation of U.S. patent application Ser. No. 14/842,142, filed on Sep. 1, 2015; which claims priority to Japanese Patent Application No. 2015-004740, filed on Jan. 14, 2015. The disclosures of the prior applications are incorporated herein by reference.

FIELD

The technology shown here relates to an information processing system, an information processing apparatus, and an information processing method that are capable of performing near field communication such as NFC (Near Field Communication), and a storage medium having stored therein an information processing program capable of performing near field communication such as NFC (Near Field Communication).

BACKGROUND AND SUMMARY

Conventionally, there is a system for downloading a client application from a server on a network through wireless communication, thereby performing processing based on the client application.

The system, however, can merely acquire a client application from the server on the network, but cannot acquire the client application by another means.

It is an object of an exemplary embodiment to provide an information processing system, an information processing apparatus, and an information processing method that are capable of acquiring a content using a plurality of types of means, and a storage medium having stored therein an information processing program capable of acquiring a content using a plurality of types of means.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of an information processing system according to the exemplary embodiment, an information processing system includes a server and an information processing apparatus. The information processing apparatus includes a computer processor configured to: as first data acquisition, acquire data from the server via a predetermined network; as second data acquisition, perform near field communication with an information storage medium, thereby acquiring data from the information storage medium; execute an application in which a predetermined content can be used; as first content acquisition, based on the data acquired in the first data acquisition, acquire a content that can be used in the application; and as second content acquisition, based on the data acquired in the second data acquisition, acquire a content that can be used in the same application as an application in which a content that can be acquired in the first content acquisition is used.

Based on the above, it is possible to acquire a content from a server via a predetermined network and also acquire, from an information storage medium through near field communication, a content that can be used in the same application. This makes it possible to acquire a content that can be used in the same application, using a plurality of acquisition methods.

In addition, in the second content acquisition, the content may be acquired by performing a process of, based on the data acquired in the second data acquisition, allowing use of a content stored in advance in the information processing apparatus, or by reading data representing a content from the information storage medium in the second data acquisition.

Based on the above, if a content is acquired from the information storage medium through near field communication, it is possible to acquire the content not via the network.

In addition, the server may include a computer processor configured to, in accordance with a request from the information processing apparatus to acquire the content, perform a process of charging a user of the information processing apparatus in accordance with the content.

Based on the above, it is possible to charge for a content that can be acquired from the server via the predetermined network.

In addition, the computer processor of the information processing apparatus may be further configured to prompt the user to select a content from among a plurality of contents acquired in the first content acquisition and/or the second content acquisition. In this case, the application may be executed using the content selected from among the plurality of contents.

Based on the above, it is possible to execute an application using a content desired by a user.

In addition, in the first content acquisition and the second content acquisition, a content belonging to a content group of the same type that can be used in the application may be able to be acquired.

Based on the above, it is possible to acquire a content of the same type using a plurality of acquisition methods.

In addition, in the first content acquisition and the second content acquisition, the same content that can be used in the application may be able to be acquired.

Based on the above, it is possible to acquire the same content using a plurality of acquisition methods.

In addition, a content that can be acquired in the first content acquisition and a content that can be acquired in the second content acquisition may be contents belonging to content groups of different types that can be used in the application.

Based on the above, it is possible to acquire contents of different types using a plurality of acquisition methods.

In addition, the server may comprise a computer processor configured to, in accordance with a request from the information processing apparatus, present contents that can be acquired by the information processing apparatus. The computer processor of the information processing apparatus may be further configured to, based on the presented contents, prompt a user to select a content. In the first content acquisition, the content selected by the user is acquired.

Based on the above, it is possible to select a content desired by a user and acquire the selected content from the server.

In addition, the information storage medium may have an external appearance related to a predetermined character. In the second content acquisition, a content related to the character may be acquired based on information from the information storage medium.

Based on the above, it is possible to acquire a content based on the external appearance of the information storage medium. This enables a user to intuitively know from the external appearance of the information storage medium a content that can be acquired.

In addition, the information storage medium may store as the information an identification code regarding the character.

Based on the above, it is possible to easily set a content based on the external appearance of the information storage medium, using an identification code regarding a character.

In addition, the content acquired in the first content acquisition and the content acquired in the second content acquisition may be displayed together in a list on a display apparatus, thereby prompting a user to select a content from among the contents displayed in the list.

Based on the above, a content acquired from the server and a content acquired from the information storage medium are displayed in a list. Thus, the user can select a content from these contents without distinguishing them and use the selected content in the application.

In addition, the content acquired in the first content acquisition and the content acquired in the second content acquisition may be displayed on a display apparatus by distinguishing the contents, thereby prompting a user to select a content from among the displayed contents.

Based on the above, a content acquired from the server and a content acquired from the information storage medium are displayed by distinguishing them. This makes it possible to select a content to be used in the application, taking into account the acquisition source of the content.

In addition, the information processing apparatus may further include a content storage unit. The content storage unit stores at least the content acquired in the second content acquisition. In this case, even in a state where the information processing apparatus cannot perform the near field communication with the information storage medium, the application may be able to be executed using the content stored in the content storage unit.

Based on the above, it is not necessary to perform near field communication with the information storage medium every time a content is used. This can improve the convenience of a content.

In addition, in the first content acquisition and/or the second content acquisition, a process may be performed of allowing simultaneous use of a plurality of contents stored in advance in the information processing apparatus based on data acquired in the first data acquisition and the second data acquisition.

Based on the above, it is possible to simultaneously acquire a plurality of contents.

In addition, in the first content acquisition and/or the second content acquisition, a process may be performed of allowing, by updating the executed application, use of the contents acquired based on the pieces of data acquired in the first data acquisition and/or the second data acquisition.

Based on the above, it is possible to acquire a content of which the use will be allowed in the future.

In addition, the application using the contents acquired in the first content acquisition and/or the second content acquisition may be able to be executed, and another application different from the application may also be able to be executed using the data acquired in the second data acquisition.

Based on the above, the information storage medium can also be used in another application. This can improve the utility value of the information storage medium.

In addition, processing using the contents acquired in the first content acquisition and/or the second content acquisition may be able to be performed, and processing different from the processing using the contents may also be able to be performed using the data acquired in the second data acquisition.

Based on the above, the information storage medium can be used for a purpose other than the addition of a content. This can improve the utility value of the information storage medium.

In addition, the application may be executed, thereby enabling game processing using the contents acquired in the first content acquisition and/or the second content acquisition.

Based on the above, it is possible to use in an added system a content used in a game.

In another exemplary configuration of the information processing system according to the exemplary embodiment, an information processing system includes a server and an information processing apparatus. The information processing apparatus includes a computer processor configured to: as first data acquisition, acquire data from the server via a predetermined network; as second data acquisition, perform near field communication with an information storage medium, thereby acquiring data from the information storage medium; as first content acquisition, based on the data acquired in the first data acquisition, acquire a predetermined content; and as second content acquisition, based on the data acquired in the second data acquisition, acquire the same content as the content.

Based on the above, it is possible to acquire a content from a server via a predetermined network and also acquire the same content from an information storage medium through near field communication. This makes it possible to acquire the same content using a plurality of units.

In addition, in the second content acquisition, a content that allows execution of a predetermined application only for a predetermined period may be able to be acquired. In the first content acquisition, a content that allows the execution of the application without limitation of a period may be able to be acquired.

Based on the above, it is possible to construct a system for acquiring, from the information storage medium through near field communication, a content of which the usable period is limited, such as a trial content, and acquiring, from the server via the predetermined network, a content of which the usable period is not limited, such as a product of the content.

In addition, in the first content acquisition, a content that allows execution of a predetermined application only for a predetermined period may be able to be acquired. In the second content acquisition, a content that allows the execution of the application without limitation of a period may be able to be acquired.

Based on the above, it is possible to construct a system for acquiring, from the server via the predetermined network, a content of which the usable period is limited, such as a trial content, and acquiring, from the information storage medium through near field communication, a content of which the usable period is not limited, such as a product of the content.

In addition, the exemplary embodiment may be carried out in the forms of an information processing apparatus, a storage medium having stored therein an information processing program, and an information processing method.

According to the exemplary embodiment, it is possible to acquire a content from a server via a predetermined network and also acquire a content from an information storage medium through near field communication. This makes it possible to acquire a content using a plurality of acquisition methods.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 1 is a diagram showing a non-limiting example of the configuration of an information processing system according to an exemplary embodiment;

DETAILED DESCRIPTION OF NON-LIMITING EXAMPLE EMBODIMENTS

Figure 2:
FIG. 2 is a diagram showing a non-limiting example of the external appearance of a tag 2.

A description is given below of an information processing system, an information processing apparatus, an information processing program, and an information processing method according to an exemplary embodiment. First, the configuration of the information processing system is described. FIG. 1 is a diagram showing an example of the configuration of the information processing system according to the exemplary embodiment. As shown in FIG. 1, the information processing system includes an information processing apparatus 1, a storage medium (tag) 2, and a server 3. The information processing apparatus 1 is any information processing apparatus capable of performing wireless communication with the tag 2 in proximity to the information processing apparatus 1 (hereinafter occasionally referred to simply as "near field communication") and functioning as an initiator-side wireless communication apparatus (mainly an apparatus that gives a command to a communication partner apparatus) when the near field communication is performed. Further, the tag 2 is any information storage medium capable of performing near field communication with the information processing apparatus 1 and functioning as a wireless communication apparatus that serves as a target of the information processing apparatus 1 (mainly an apparatus that receives a command from an initiator-side wireless communication apparatus) when the near field communication is performed. Further, the information processing apparatus 1 can perform data communication with another apparatus (the server 3 in the example shown in FIG. 1) via a network.

In the exemplary embodiment, a description is given taking as an example the case where, as an example of near field communication, communication based on the NFC (Near Field Communication) standard is performed between the information processing apparatus 1 and the tag 2. Here, the term "near field communication" as used herein refers to a communication method where radio waves from an apparatus develop an electromotive force (for example, by electromagnetic induction) in another apparatus. The other apparatus can operate by the developed electromotive force (the other apparatus may or may not have a power supply). In near field communication, if the information processing apparatus 1 and the tag 2 come close to each other (typically, the distance between the information processing apparatus 1 and the tag 2 becomes dozen centimeters or less), the information processing apparatus 1 and the tag 2 become capable of communicating with each other. Further, in near field communication, radio waves continue to be transmitted while the communication between two communication apparatuses is established (a tag is close to a communication apparatus). It should be noted that in the exemplary embodiment, the information processing apparatus 1 causes the tag 2 to develop an electromotive force by electromagnetic induction, and near field communication is performed between the information processing apparatus 1 and the tag 2.

The information processing apparatus 1 is any information processing apparatus capable of performing near field communication. In the exemplary embodiment, the information processing apparatus 1 may be a mobile (or portable) apparatus such as a mobile game apparatus, a mobile phone, or a smartphone, a stationary apparatus such as a personal computer or a home game machine, or a large-sized apparatus such as a commercial arcade game apparatus. For example, the information processing apparatus 1 is a mobile device having an NFC reader/writer function.

The tag 2 is any apparatus capable of performing near field communication with the information processing apparatus 1. In the exemplary embodiment, the tag 2 is a storage medium having an NFC tag function. That is, the tag 2 includes a circuit (an IC chip) for performing near field communication and storage means (a memory or the like) for storing data. It should be noted that the tag 2 is not limited to an apparatus having only the function of storing data, and may be, for example, an information processing apparatus (a mobile device) having an NFC card emulation function.

An example of the configuration of the information processing apparatus 1 is described below. As shown in FIG. 1 the information processing apparatus 1 includes a near field communication section 11. For example, the near field communication section 11 is an antenna for use in near field communication. Further, the information processing apparatus 1 includes a communication chip 12. In accordance with an instruction from a CPU 13 described later, the communication chip 12 generates a signal (radio waves) to be sent from the near field communication section 11 and sends the signal from the near field communication section 11. The communication chip 12 is, for example, an NFC chip (an NFC integrated circuit). It should be noted that in another exemplary embodiment, a communication module (for example, an NFC module) having the functions of the near field communication section 11 and the communication chip 12 may be connected (attached) to the information processing apparatus 1. This communication module may be configured to be attachable to and detachable from the information processing apparatus 1.

In addition, the information processing apparatus 1 includes a CPU 13 and a memory 14. The CPU 13 is an information processing section for performing various types of information processing to be performed by the information processing apparatus 1. The CPU 13 performs the various types of information processing using the memory 14.

The information processing apparatus 1 includes a program storage section 15. The program storage section 15 stores various programs (for example, a communication program and an application program) to be executed by the information processing apparatus 1. The program storage section 15 is any storage device (storage medium) accessible by the CPU 13. The program storage section 15 may be a storage section built into the information processing apparatus 1, such as a hard disk or a memory, or may be a storage medium attachable to and detachable from the information processing apparatus 1, such as an optical disc or a cartridge, or may be both the storage section and the storage medium.

In addition, the information processing apparatus 1 includes an input section 16, which receives an instruction from a user, such as a button or a touch panel. Further, the information processing apparatus 1 includes a display section 17, which displays an image generated by the above information processing. It should be noted that the display section 17 may be a display apparatus provided outside the information processing apparatus 1 and connected to the information processing apparatus 1, or may be a display apparatus attachable to and detachable from the information processing apparatus 1. Further, the input section 16 may include a touch panel for detecting a position on the display screen of the display section 17.

In addition, the information processing apparatus 1 includes a network communication section 18. The network communication section 18 includes a predetermined communication module, and transmits and receives data to and from another device (for example, the server 3) via the network. In this case, the CPU 13 has the function of, as various types of information processing, receiving data transmitted from the server 3 via the network communication section 18 and performing processing corresponding to the data, and the like. Further, the CPU 13 has the function of, as various types of information processing, performing the process of creating transmission data to be transmitted to the server 3 and transmitting the transmission data via the network communication section 18, and the like. For example, the CPU 13 executes a predetermined program, thereby achieving the above functions. It should be noted that the network communication section 18 may transmit and receive data to and from the server 3 using wireless communication via a predetermined access point.

Here, the server 3 transmits and receives a communication packet, thereby communicating with another apparatus (for example, the information processing apparatus 1) via the network. In the exemplary embodiment, in accordance with a content request from the information processing apparatus 1, the server 3 transmits, to the request source, data that allows the acquisition of the content, or transmits data representing the content per se to the request source. It should be noted that the server 3 may include a single server machine, or may include a plurality of server machines.

It should be noted that the information processing apparatus 1 may include a plurality of apparatuses. For example, in another exemplary embodiment, at least part of the information processing performed by the information processing apparatus 1 may be performed in a dispersed manner by a plurality of apparatuses capable of communicating with each other via a network (a wide-area network and/or a local network).

For example, the information processing apparatus 1 may be configured such that the CPU 13 can execute a plurality of programs such as an application program and a communication program. The application program is a program for executing any application for performing data communication with the tag 2 and may be a game program for reading game data from the tag 2 and performing game processing using the game data. The communication program is a program for performing near field communication with the tag 2, or performing network communication with the server 3. For example, the communication program is firmware or driver software for causing the communication chip 12 or the network communication section 18 to operate. The communication program receives an instruction from an application and causes the communication chip 12 or the network communication section 18 to perform an operation for communication.

FIG. 2 is a diagram showing an example of the external appearance of the tag 2. As shown in FIG. 2, the tag 2 according to the exemplary embodiment is a figure-shaped tag of which the external appearance represents a character. The character represented by the tag 2 is a character that appears in a particular application (for example, a game) executable by the information processing apparatus 1. As an example, the user can acquire a content related to the tag 2, using the tag 2. That is, when executing a program of the particular application, the information processing apparatus 1 uses data stored in the tag 2, thereby causing a content related to the tag 2 (for example, a game item) to appear in a virtual space generated by the program of the application. As another example, the user may be able to cause the character to appear in the particular application, using the tag 2. It should be noted that the figure-shaped tag 2 represents any character related to a content that can be acquired, but may represent not only a character but also an item in a game application. Further, the tag 2 may have a shape other than that of a figure, and may be, for example, a card-type tag on which a character is displayed.

As described above, the tag 2 is used in the particular application program. Although the details will be described later, the tag 2 can store data (dedicated data described later) that can be used only in the particular application program. It should be noted that the particular application program corresponding to a single type of tag may be of a single type or a plurality of types. For example, if a plurality of types of applications are provided as a single series of applications, the plurality of types of applications may be the particular application program.

It should be noted that the tag 2 may be able to be used in the particular application program and may also be able to be used in another application program. That is, the tag 2 stores data that can be used only in the particular application program and also stores data that can be used also in another application program other than the particular application program. An example of the data stored in the tag 2 is described below.

Figure 3:
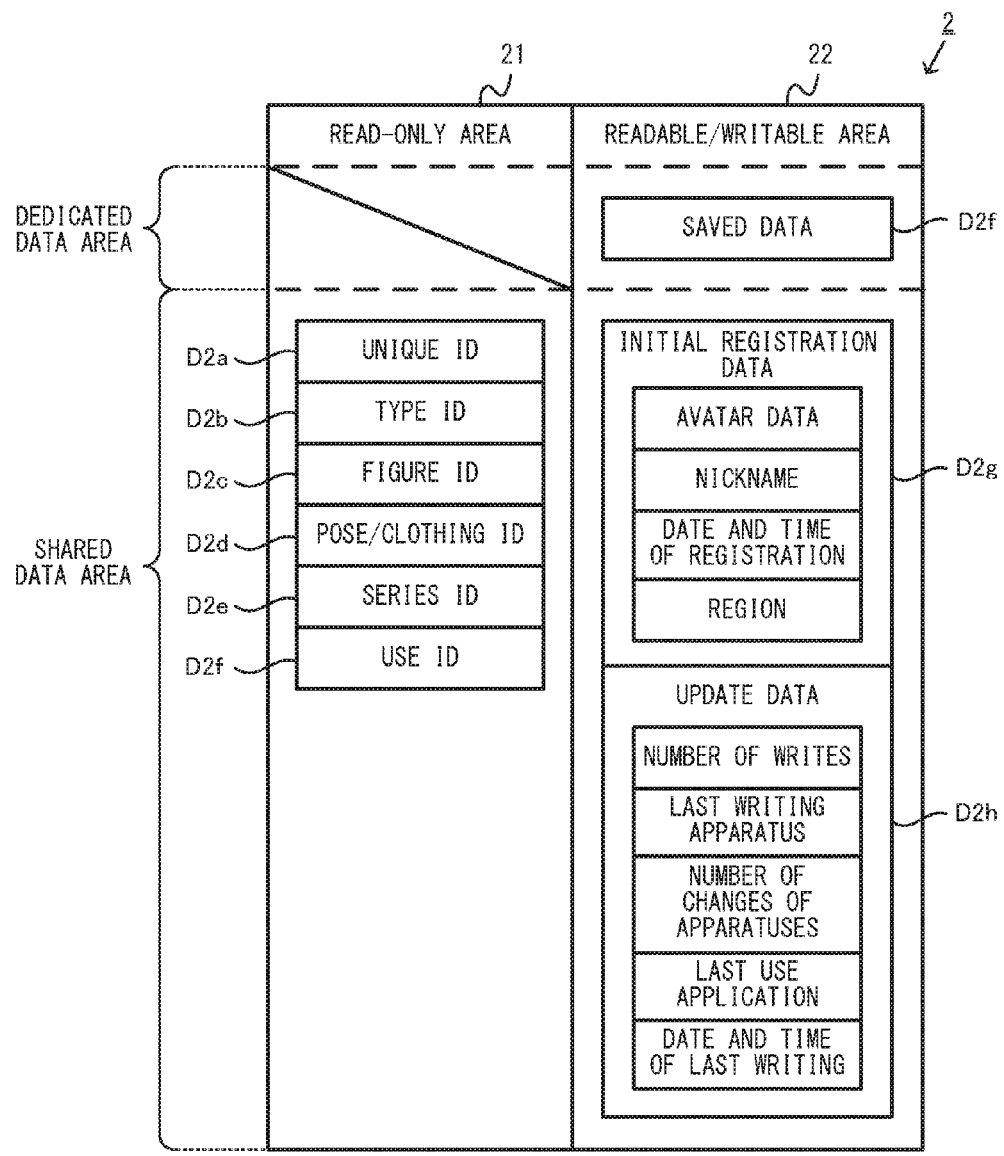
FIG. 3 is a diagram showing a non-limiting example of data stored in the tag 2.

FIG. 3 is a diagram showing an example of data stored in the tag 2. In the exemplary embodiment, as shown in FIG. 3, the tag 2 includes a read-only area 21 and a readable/writable area 22. The read-only area 21 is a storage area where it is only possible to read data. The readable/writable area 22 is a storage area where it is possible to read and write data. The read-only area 21 is a storage area where data is stored at the time of manufacture of the tag 2, and the writing of data is prohibited after that (after the shipping of the tag 2). That is, the information processing apparatus 1 (an application executed by the information processing apparatus 1) cannot write data to the read-only area 21. On the other hand, the information processing apparatus 1 (an application executed by the information processing apparatus 1) can read and write data from and to the readable/writable area 22. It should be noted that at the time of the shipping of the tag 2, data may or may not be stored in advance in the readable/writable area 22. In either case, if the tag 2 and the information processing apparatus 1 communicate with each other, the information processing apparatus 1 writes data to the readable/writable area 22, and the data is stored in the readable/writable area 22.

In addition, in the exemplary embodiment, broadly, two types of data including dedicated data and shared data are stored in the tag 2. It should be noted that as shown in FIG. 3, in the exemplary embodiment, it is assumed that storage areas (a dedicated data area and a shared data area) where these pieces of data are stored are determined in advance. Alternatively, in another exemplary embodiment, these storage areas may not be determined.

The dedicated data is data that can be used only in the above particular application program. In the exemplary embodiment, the dedicated data includes saved data D2*f* of the particular application program (see FIG. 3). As the saved data D2*f*, for example, data representing a parameter regarding the character represented by the tag 2, data representing the progress state of the game of the particular application program, data regarding a player in the game of the particular application program, and/or the like are stored. It should be noted that in the exemplary embodiment, the dedicated data is stored in the readable/writable area 22 and is not stored in the read-only area 21 (see FIG. 3).

Next, the shared data is described. The shared data is data that can be used regardless of whether or not the program is the particular application program. In the exemplary embodiment, the shared data is stored in both the read-only area 21 and the readable/writable area 22. It should be noted that the tag 2 may store the shared data only in either one of the read-only area 21 and the readable/writable area 22.

In the read-only area 21, as the shared data, at least unique ID data D2*a*, type ID data D2*b*, figure ID data D2*c*, pose/clothing ID data D2*d*, series ID data D2*e*, use ID data D2*f*, and the like may be stored.

For example, the unique ID data D2*a* is data representing identification information unique to the tag 2. Here, an NFC tag such as the tag 2 in the exemplary embodiment stores identification information unique to the tag, termed a UID (Unique ID). The unique ID data D2*a* is data representing information different from that of the UID. The unique ID data D2*a* is data representing an ID assigned to the tag 2 aside from the UID so that a provider of a service using the tag 2 can easily manage the tag 2.

The figure ID data D2*c* is data representing identification information unique to the external appearance (the shape and the color) of the figure-shaped tag 2. The figure ID data D2*c* is data representing identification information (an ID unique to the character) that allows the unique identification of the type of the figure (for example, a character name) of the tag 2.

The pose/clothing ID data D2*d* is data representing the external appearance of the character, such as a pose and clothing. For example, if there are a plurality of types of tags different in external appearance (for example, different in pose or clothing) for a single character, a pose/clothing ID having a different value is set for each tag.

It should be noted that an application program executable by the information processing apparatus 1 includes information about a figure ID of a tag used (that can be used) by the information processing apparatus 1. For example, the value of a figure ID included in the application program and the value of a figure ID stored in the tag 2 coincide with each other, the application program can use the dedicated data stored in the tag 2. That is, a figure ID can also be said to be identification information for managing the use of the dedicated data stored in the tag 2.

The series ID data D2*e* is data representing identification information unique to a group to which an object (a character) represented by the tag 2 belongs. For example, if the character represented by the tag 2 appears in a plurality of types of applications (for example, a series of game applications), the plurality of types of applications may be set as a single group, and data representing a group ID indicating this group may be set as the series ID data D2*e*.

The type ID data D2*b* is data representing identification information indicating the type of the tag 2. In the exemplary embodiment, the information processing apparatus 1 can also use a card-type tag, as well as a figure-shaped tag such as the tag 2. The type ID data D2*b* is data representing identification information indicating a figure-shaped tag or a card-type tag as the type of tag. It should be noted that in another exemplary embodiment, any type of tag can be identified by the type ID data D2*b*. For example, different type IDs may be assigned to respective manufacturers providing the tag 2.

The use ID data D2*f* is data representing identification information for identifying an application program (a particular application program) that can use the dedicated data stored in the tag 2. Here, a use ID is assigned to an application program executable by the information processing apparatus 1. In the exemplary embodiment, a figure ID is used to manage the use of the dedicated data stored in the tag 2. Alternatively, in another exemplary embodiment, a use ID may be used to manage the use of the dedicated data stored in the tag 2.

In addition, as shown in FIG. 3, in the readable/writable area 22, as the shared data, initial registration data D2*g* and update data D2*h* are stored. It should be noted that the content of the shared data stored in the tag 2 is any content. For example, in another exemplary embodiment, the tag 2 may store only either one of the initial registration data D2*g* and the update data D2*h* as the shared data.

The initial registration data D2*g* is data registered by the user when the use of the tag 2 is started by the information processing apparatus 1. It should be noted that typically, the initial registration data D2g is stored in the tag 2 at the timing when the tag 2 is first used. Alternatively, the initial registration data D2g may be stored in the tag 2 at any timing. That is, the user may register data in the tag 2 at any timing. For example, the initial registration data D2g may include data representing avatar data, a nickname, the date and time of registration, a region, and the like.

The avatar data is data of an avatar of the user. The avatar data includes data used by the information processing apparatus 1 to generate an avatar and display the avatar on the display section 17. Specifically, the avatar data includes data representing parts (the shapes of the eyes, nose, and the like, the habitus, and the like) of the avatar. It should be noted that in the exemplary embodiment, it is assumed that a program for generating an avatar using the avatar data is stored in the information processing apparatus 1. In the exemplary embodiment, a program for generating an avatar is stored in advance in the information processing apparatus 1, and each application program can display the avatar.

The nickname is a nickname given to the tag 2 by the user. For example, if a single user owns two or more tags having the same external appearance, nicknames different from each other are given to these tags, whereby it is possible to distinguish each tag. When an initial registration process is performed on the tag 2, the information processing apparatus 1 may cause the user to input avatar data and a nickname. In this case, the input data is stored in the tag 2 as the initial registration data D2g together with data of the date and time of registration and the region described later.

The date and time of registration is the date and time when initial registration has been performed. Further, the region is the region where initial registration has been performed. For example, data of the date and time of registration and the region may be automatically written to the tag 2 by the information processing apparatus 1 in the initial registration process.

Next, information included in the update data D2h is described. The update data D2h is data of which the content is updated (under a certain condition) when the tag 2 and the information processing apparatus 1 communicate with each other. For example, the update data D2h may include data representing the number of writes, a last writing apparatus, the number of changes of apparatuses, a last use application, the date and time of the last writing, and the like. For example, the update data D2h stored in the tag 2 may be updated (overwritten) at the timing when the dedicated data is written.

The number of writes is the number of times the dedicated data has been written to the tag 2. The last writing apparatus is an information processing apparatus having written the dedicated data to the tag 2 last. For example, if unique identification information is assigned to each information processing apparatus, the identification information or a hash value of the information processing apparatus having written the dedicated data may be stored as data of the writing apparatus. The number of changes of apparatuses is the number of times information processing apparatuses for writing the dedicated data have been changed. For example, if an information processing apparatus of the user writes the dedicated data to the tag 2, and then, an information processing apparatus different from the information processing apparatus of the user (for example, an information processing apparatus installed in a store where the user has gone to, or an information processing apparatus of a friend of the user) writes the dedicated data to the tag 2, the number of changes of apparatuses is incremented. The last use application is an application program having written the dedicated data to the tag 2 last. For example, as data of the last use application, not the above use ID but data of identification information unique to each application program may be stored. The date and time of the last writing is the date and time when the dedicated data has been written to the tag 2 last.

It should be noted that the dedicated data and the shared data may be encrypted by a method that enables the information processing apparatus 1 to decrypt the dedicated data and the shared data. It should be noted that the encryption method of the dedicated data and the encryption method of the shared data may be the same or may be different. Thus, even if an apparatus that does not have a decryption function by the above method reads the dedicated data and the shared data from the tag 2, the apparatus cannot decipher the contents of the dedicated data and the shared data. This can improve the security of data in the tag 2. It should be noted that in another exemplary embodiment, one of the dedicated data and the shared data may not be encrypted.

First Exemplary Embodiment

Figure 4:
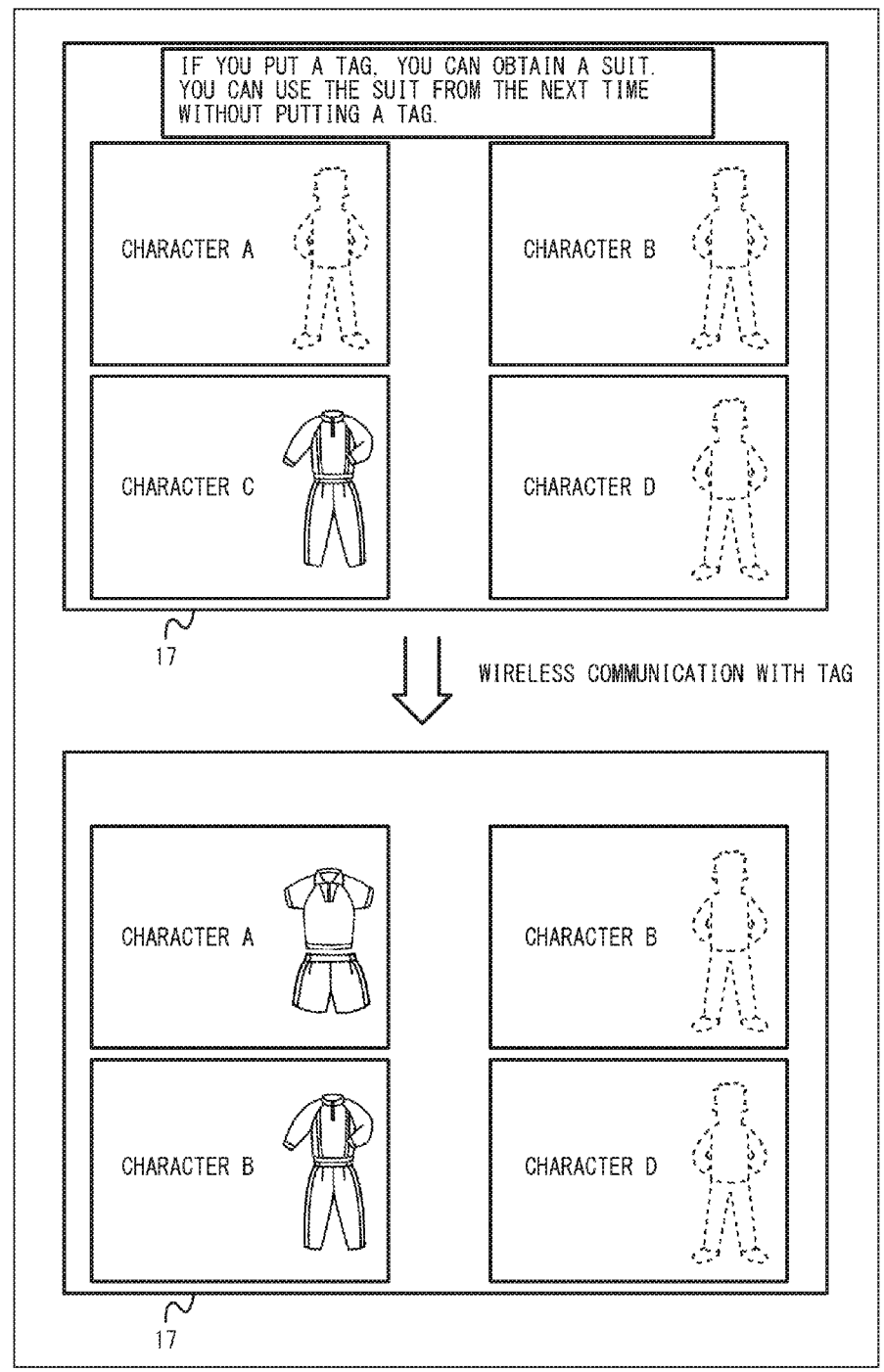
FIG. 4 is a diagram showing a non-limiting example of a display screen displayed on a display section 17 in information processing according to the first exemplary embodiment.

Next, with reference to FIG. 4, a description is given of a specific example of information processing according to a first exemplary embodiment. It should be noted that FIG. 4 is a diagram showing an example of a display screen displayed on the display section 17 in the information processing according to the first exemplary embodiment.

As shown in FIG. 4, in the exemplary embodiment, as an example of a content that can be used in the particular application, a clothes object (a suit) to be worn by a character can be acquired using a plurality of types of acquisition means. For example, a clothes object is a content that can be worn by a character that appears in a virtual space constructed by executing the particular application (for example, a game space constructed by executing a game application). Then, if the user of the information processing apparatus 1 performs the operation of causing a character to wear a clothes object, the character appears in the virtual space, wearing the clothes object. It should be noted that a different type of clothes object is set in accordance with the type of a character that appears in the virtual space. A plurality of types of clothes objects may be set for a single character.

In the example shown in FIG. 4, at an early stage, only a clothes object that can be worn by a character C is displayed in a usable state, and clothes objects of other characters A, B, and D are all in unusable states. Then, the information processing apparatus 1 performs wireless communication with the tag 2, thereby newly changing the state of the clothes object to be worn by the character A to a usable state. This is caused by the user of the information processing apparatus 1 causing the information processing apparatus 1 to perform near field communication with the tag 2 related to the character A. In accordance with the near field communication, the use of a clothes object related to the tag 2 (that is, the clothes object that can be worn by the character A) is allowed. It should be noted that regarding the clothes object for the character A of which the use is allowed by the near field communication with the tag 2, once the use is allowed, this use-allowed state may continue after that even if the information processing apparatus 1 is not performing near field communication with the tag 2. Alternatively, if the information processing apparatus 1 is not performing near field communication with the tag 2, the use-allowed state may return to the unusable state.

For example, if the information processing apparatus 1 becomes able to perform near field communication with the tag 2, the information processing apparatus 1 reads the unique ID data D2a, the figure ID data D2c, the pose/clothing ID data D2d, the use ID data D2f, and the like from the tag 2. Next, based on the read data, the information processing apparatus 1 determines in which application the tag 2 can be used, and to which character the tag 2 is related, and to which external appearance (for example, the clothing and the pose of the character) the tag 2 is related, and the like. Then, if the tag 2 can be used in an application that is currently executed, the information processing apparatus 1 extracts a clothes object that can be used in the application, and sets the clothes object so that the clothes object can be used. Here, the clothes object that can be used can be worn by the character indicated by the figure ID data D2c, and is of the type indicated by the pose/clothing ID data D2d. It should be noted that content data of the clothes object per se that can be used may be included in advance in the application that is currently executed, or may be read from the tag 2 having allowed the use of the clothes object. In the first case, the information processing apparatus 1 performs the process of allowing the use of the content data included in advance. In the second case, the read-only area 21 of the tag 2 stores the content data, and the information processing apparatus 1 reads the content data from the tag 2.

In the exemplary embodiment, the information processing apparatus 1 can also acquire (that is, allow the use of) the content data from the server 3 via the network. Here, a content that can be acquired from the server 3 is a content belonging to a content group of the same type as that of a content that can be acquired from the tag 2 (that is, a clothes object). A content that can be acquired from the server 3 may be the same content as a content that can be acquired from the tag 2 (for example, the clothes object for the character A), or may be a content different from a content that can be acquired from the tag 2 (for example, the clothes object for the character D, which cannot be acquired from the tag 2).

For example, the user of the information processing apparatus 1 can access the server 3, purchase a desired clothes object (the right of use of a clothes object), and use the clothes object in the virtual space constructed in the above application. Specifically, if the information processing apparatus 1 becomes able to communicate with the server 3, the information processing apparatus 1 requests, together with the type of an application to be used, the server 3 to acquire content data that can be used in the application. In response to the acquisition request, the server 3 presents to the request source the types of contents that can be used by the information processing apparatus 1. Then, the information processing apparatus 1 displays, on the display section 17, images representing the types of contents presented by the server 3 (that is, images of clothes objects that can be acquired), thereby prompting the user to make a selection. Then, the information processing apparatus 1 transmits, to the server 3, data representing the type of a content selected in accordance with a selection operation. If content data to be acquired is selected, the server 3 performs the process of charging the user having made the acquisition request, where necessary, and then transmits, to the information processing apparatus 1 as the request source, data that allows the use of the content data. Such processing enables the information processing apparatus 1 to use the requested content data (that is, the clothes object) in the application. It should be noted that content data of the clothes object per se of which the use is allowed via the server 3 may be included in advance in the application that is currently executed, or may be downloaded from the server 3. In the first case, the information processing apparatus 1 performs the process of, in accordance with the fact that data acquired from the server 3 and a predetermined password presented by the server 3 are input, allowing the use of the content data included in advance.

It should be noted that in the above description, an example has been used where, when the information processing apparatus 1 accesses the server 3 to acquire a desired clothes object (the right of use of a clothes object), a charging process is performed. Alternatively, the clothes object may be able to be acquired free of charge. Yet alternatively, if a clothes object is acquired using the tag 2, the clothes object may be paid for. For example, if the user purchases a tag 2 per se and acquires a clothes object using near field communication with the tag 2, it can be considered that the clothes object is paid for due to the purchase of the tag 2.

In addition, if a clothes object is acquired using near field communication with a tag 2, the number of times the clothes object can be acquired from the tag 2 may be limited. As an example, clothes object acquired flag data is set in the readable/writable area 22 (for example, the update data D2h) of the tag 2. If a clothes object is acquired as many times as the limited number of times (for example, once), a clothes object acquired flag is set to on and stored. Then, if the acquired flag data of the tag 2 indicates that the clothes object acquired flag is on, a setting is made so that the process of acquiring the clothes object corresponding to the clothes object acquired flag cannot be performed. This limits the acquisition of the clothes object to the limited number of times (for example, only once). It should be noted that a clothes object acquired flag may be set for each application in which a clothes object is used.

As another example, in another apparatus (for example, the server 3) capable of performing data communication with the information processing apparatus 1, clothes object acquisition information is set for each tag 2, and the state of acquisition of a clothes object in the tag 2 is managed through the data communication. For example, if the information processing apparatus 1 attempts to acquire a clothes object using near field communication with a tag 2, the information processing apparatus 1 inquires of the server 3 about whether the clothes object can be acquired. Then, if the clothes object can be acquired, the information processing apparatus 1 transmits, to the server 3, identification information unique to the tag 2 (for example, the unique ID data D2a) together with information indicating the type of a clothes object to be acquired and the type of an application to be used, and acquires the clothes object from the tag 2. In response to this, based on the transmitted data, the server 3 manages the type of the acquired clothes object and the application in which the clothes object is used, with respect to each tag 2. Then, in response to an inquiry from another apparatus about whether or not a clothes object can be acquired, the server 3 replies to the inquiry source in accordance with the above management state.

In addition, in the above description, as an example of a content that can be acquired using a plurality of types of acquisition means, a clothes object to be worn by a character has been used. However, it goes without saying that the content may be another content. For example, the form may be such that a character per se, an item, an ability, a sound such as a composition, or the like that can be used in the particular application can be newly acquired as a content. Alternatively, the form may be such that a virtual currency that can be used in a virtual world constructed in the particular application is added as a content. Yet alternatively, the form may be such that a stage that can be played in the particular application can be newly acquired as a content.

In addition, if a content is acquired from the tag 2 and/or the server 3, the user may select a content to be used in an application. For example, after an application is executed in which a content can be used, a screen for prompting the user to select a content to be used in the application is displayed on the display section 17, and the content selected in accordance with a user operation can be used in the subsequent processing. If the user is prompted to make a selection, a content acquired from the tag 2 and added and a content acquired from the server 3 and added may be displayed in a list on the display section 17 by distinguishing the contents from each other. Alternatively, a content acquired from the tag 2 and added and a content acquired from the server 3 and added may be displayed in a list on the display section 17 without distinguishing the contents from each other. Further, if the user is prompted to make a selection, contents prepared in advance in the particular application may also be displayed in a list on the display section 17, in addition to a content acquired from the tag 2 and added and/or a content acquired from the server 3 and added. In this case, examples of the contents prepared in advance in the particular application can include contents always displayed in a list in an initial state, and a content added to a displayed list by satisfying a predetermined condition when the application is executed.

In addition, in accordance with a single round of near field communication with the tag 2 or a single content acquisition request to the server 3, the use of a plurality of contents may be allowed. The plurality of contents of which the use is allowed may include a content of which the use is allowed by updating at a later date an application using the content.

In addition, a tag 2 having supplied a content that can be used in a predetermined application may be configured to be used also in another application. The form in which the tag 2 is used in another application may be a form in which a new content is supplied also in another application using near field communication with the tag 2, or a form other than the supply of a new content. For example, as a form other than the supply of a new content, a form is possible in which part of the situation of a virtual world constructed in another application is changed by, for example, deleting some of contents from the virtual world.

In addition, in the above example of the use of the tag 2, an example has been used where the use of at least one content is allowed using near field communication with the tag 2. Alternatively, a content of which the use is allowed may randomly become capable of being used. Yet alternatively, if near field communication is sequentially performed with a plurality of tags 2, a content of which the use is allowed may vary depending on the combination of tags 2 with which the near field communication is performed, or the number of tags 2 with which wireless communication is performed. As an example, if near field communication is performed only with a first tag 2a, and even if the use of a first content is allowed, the use of a second content different from the first content may be allowed if near field communication is performed with the first tag 2a after near field communication is performed with a second tag 2b.

Figure 5:
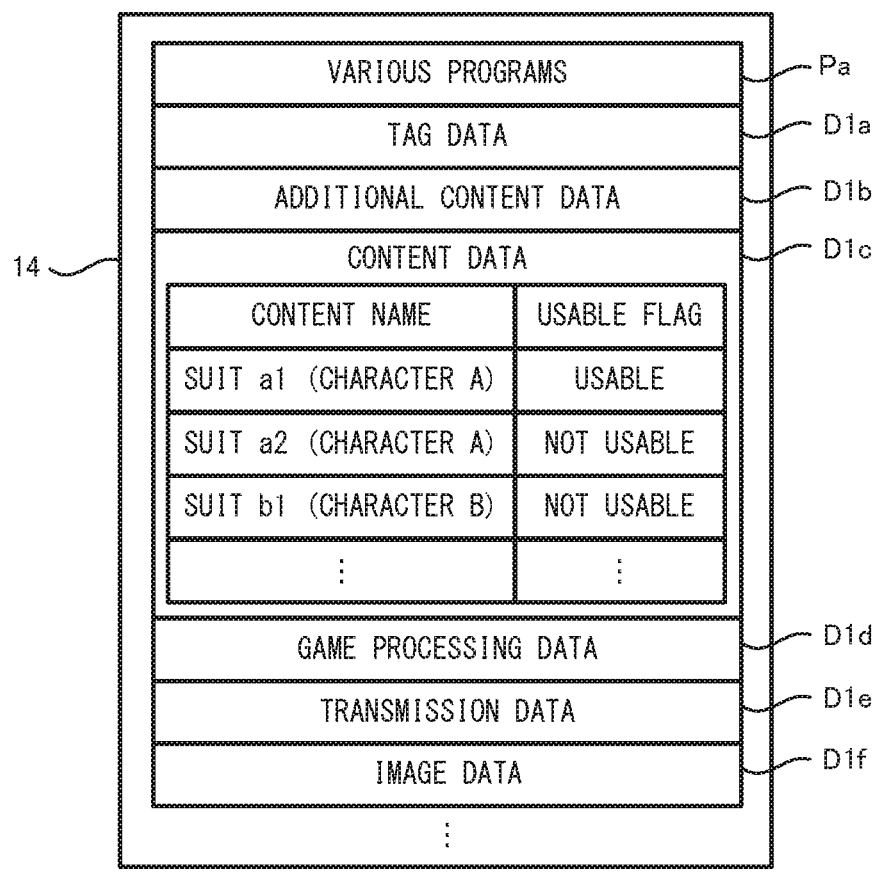
FIG. 5 is a diagram showing a non-limiting example of a data area set in a memory 14 of an information processing apparatus 1 in the first exemplary embodiment.
Figure 6:
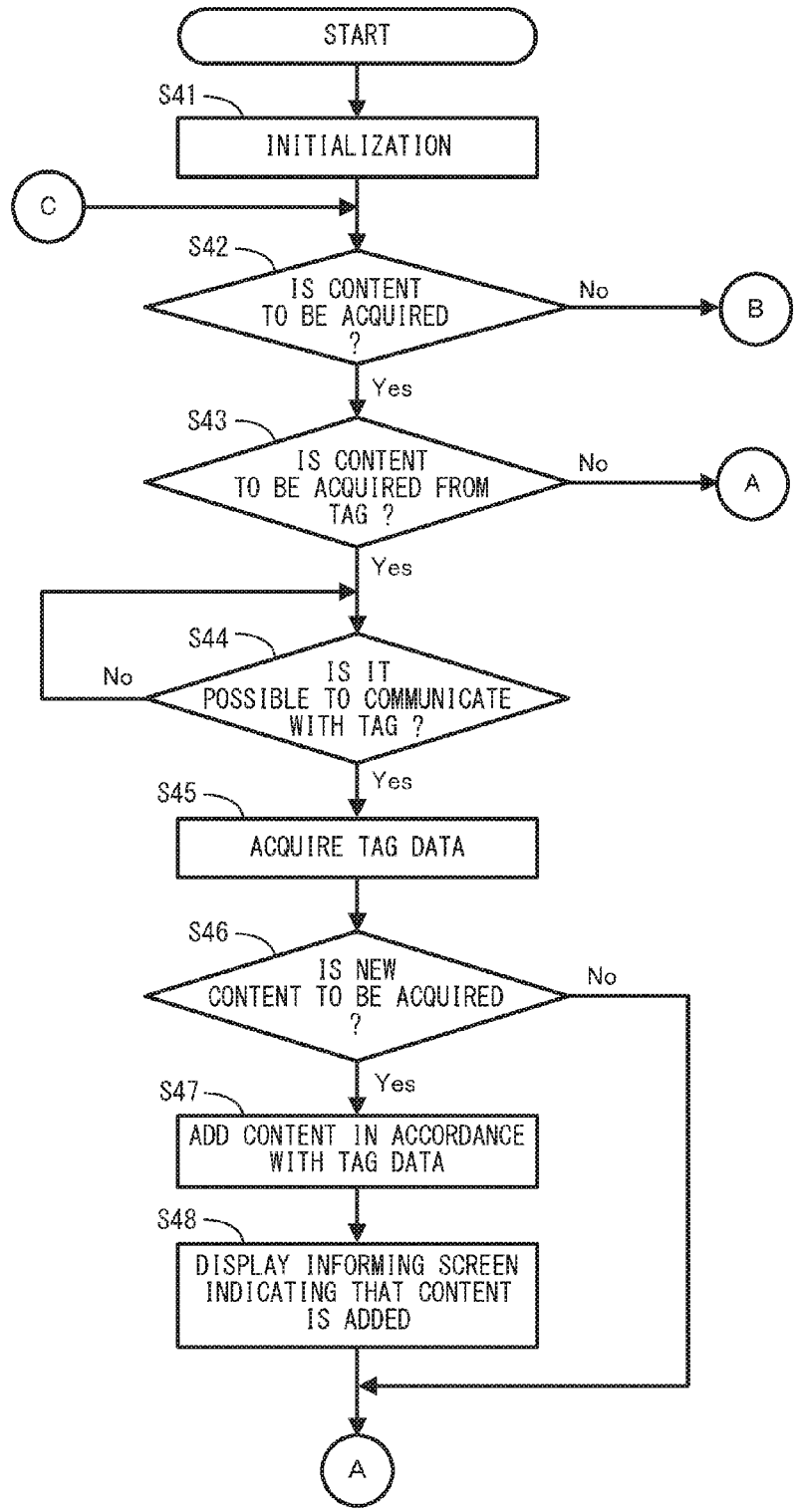
FIG. 6 is a flow chart showing a non-limiting example of the first half of information processing performed by the information processing apparatus 1 in the first exemplary embodiment.
Figure 7:
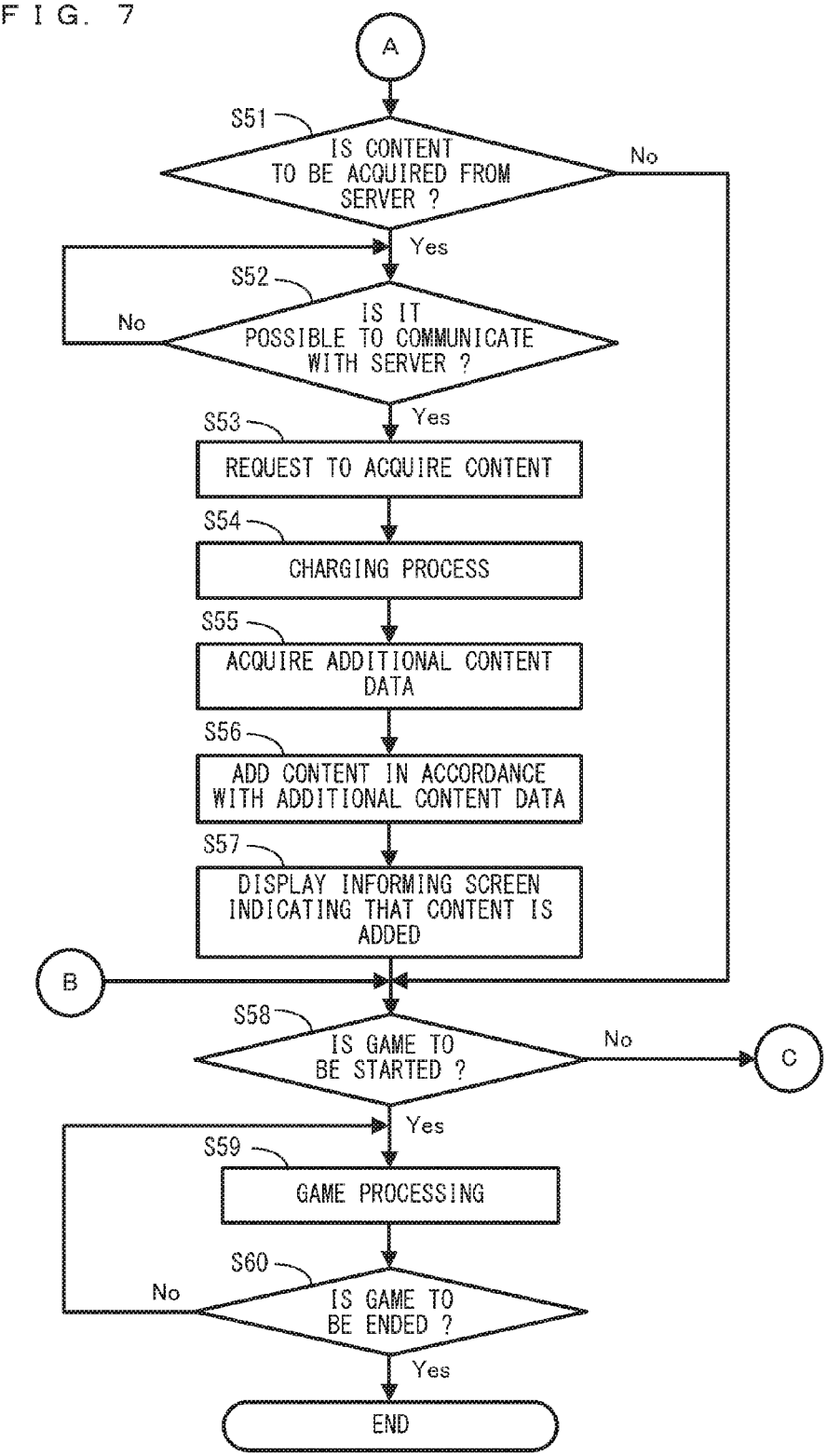
FIG. 7 is a flow chart showing a non-limiting example of the second half of the information processing performed by the information processing apparatus 1 in the first exemplary embodiment.

Next, with reference to FIGS. 5 to 7, a description is given of an example of specific processing performed by the information processing system (the information processing apparatus 1) in the exemplary embodiment. FIG. 5 is a diagram showing an example of a data area set in the memory 14 of the information processing apparatus 1 in the exemplary embodiment. It should be noted that the memory 14 stores, as well as data shown in FIG. 5, data used in other types of processing. The data, however, is not described in detail.

In a program storage area of the memory 14, various programs Pa to be executed by the information processing apparatus 1 are stored. In the exemplary embodiment, as the various programs Pa, the above communication program for performing near field communication, an application program (the above particular application program) for performing information processing (for example, game processing) using a content acquired from the tag 2 or the server 3, and the like are stored. It should be noted that the various programs Pa may be stored in advance in the program storage section 15, or may be acquired from a storage medium attachable to and detachable from the information processing apparatus 1 and stored in the memory 14, or may be acquired from another apparatus via a network such as the Internet and stored in the memory 14. The CPU 13 executes the various programs Pa stored in the memory 14.

Further, in a data storage area of the memory 14, various types of data used in the communication process and the information processing to be performed by the information processing apparatus 1 are stored. In the exemplary embodiment, the following are stored in the memory 14: tag data D1a; additional content data D1b; content data D1c; game processing data D1d; transmission data D1e; image data D1f; and the like.

The tag data D1a is data acquired from the tag 2 through near field communication and is data representing the shared data and the like received from the tag 2. The additional content data D1b is data for adding a content acquired using the tag 2 or using data communication with the server 3 and is data of the content per se, data for allowing the use of the content, and the like. The content data D1c is data representing a content that can be used in an application when the application is executed. For example, in the content data D1c, with respect to each content that can be added when an application is executed, a usable flag is set that indicates whether or not the content can be currently used. In the example of the content data D1c shown in FIG. 5, a suit a1, which can be worn by the character A, is set to "usable". A suit a2, which can be worn by the character A, and a suit b1, which can be worn by the character B, are set to "unusable". The game processing data D1d is data used to perform a game by executing an application. The transmission data D1e is data to be transmitted to the tag 2 or the server 3 when the above data communication process is performed. The image data D1f is data for displaying an image on the display section 17 when the above game is performed.

Next, a detailed example of information processing (game processing) in the exemplary embodiment is described. FIG. 6 is a flow chart showing an example of the first half of the information processing performed by the information processing apparatus 1 in the exemplary embodiment. FIG. 7 is a flow chart showing an example of the second half of the information processing performed by the information processing apparatus 1 in the exemplary embodiment. In the exemplary embodiment, a series of processes shown in FIGS. 6 and 7 is performed by the CPU 13 executing the communication program and a predetermined application program (a game program) included in the various programs Pa. It should be noted that the information processing shown in FIGS. 6 and 7 may be started at any timing. Further, in FIGS. 6 and 7, all the steps performed by the CPU 13 are abbreviated as "S".

It should be noted that the processes of all the steps in the flow charts shown in FIGS. 6 and 7 are merely illustrative. Thus, the processing order of the steps may be changed, or another process may be performed in addition to (or instead of) the processes of all the steps, so long as similar results are obtained. Further, in the present exemplary embodiment, a description is given on the assumption that the CPU 13 performs the processes of all the steps in the flow charts. Alternatively, a processor or a dedicated circuit other than the CPU 13 may perform the processes of some of the steps in the flow charts.

Referring to FIG. 6, the CPU 13 performs the initialization of information processing (for example, game processing) (step 41), and the processing proceeds to the next step. For example, in the initialization, the CPU 13 initializes a parameter for performing the processing described below.

Next, the CPU 13 determines whether or not a content is to be acquired (step 42). For example, the CPU 13 displays on the display section 17 an option indicating that a content is to be newly acquired. If the operation of selecting the option is performed, the CPU 13 determines that a content is to be acquired. Then, if a content is to be acquired, the processing proceeds to step 43. If, on the other hand, a content is not to be acquired, the processing proceeds to step 58 (see FIG. 7).

In step 43, the CPU 13 determines whether or not the content is to be acquired from the tag. For example, the CPU 13 displays on the display section 17 an option indicating that a content is to be newly acquired from the tag, and an option indicating that a content is to be newly acquired from the server 3. If the operation of selecting the option indicating that a content is to be acquired from the tag is performed, the CPU 13 determines that the content is to be acquired from the tag. Then, if the content is to be acquired from the tag, the processing proceeds to step 44. If, on the other hand, the content is not to be acquired from the tag, the processing proceeds to step 51 (see FIG. 7).

Next, in step 44, the CPU 13 performs the process of receiving data from the tag 2 and determines whether or not it is possible to perform near field communication with the tag 2. For example, the CPU 13 supplies power to an antenna (the near field communication section 11) for performing near field communication with the tag 2, thereby attempting to perform near field communication with an object (for example, the tag 2) placed near the antenna. Then, if it is possible to perform near field communication with the tag 2 via the antenna (the near field communication section 11), the processing proceeds to step 45. If, on the other hand, it is not possible to perform near field communication with the tag 2 via the antenna (the near field communication section 11), the CPU 13 repeats the process of step 44 and attempts to perform wireless communication with the tag 2 again. It should be noted that if the state where it is not possible to perform wireless communication with the tag 2 continues for a predetermined time or more after the operation of selecting the option indicating that a content is to be acquired from the tag 2, the CPU 13 may display, on the display section 17, information indicating that wireless communication with the tag 2 times out. Then, the CPU 13 may return to the above step 42 and continue the process thereof.

In step 45, the CPU 13 communicates with the tag 2 via the antenna (the near field communication section 11), acquires the shared data and the like from the tag 2, and stores the shared data and the like in the tag data D1a. Then, the processing proceeds to the next step.

Next, the CPU 13 determines whether or not a content is to be newly acquired (step 46). For example, the CPU 13 analyzes the tag data acquired in the above step 45 and sets a content that can be acquired from the tag 2 with which the near field communication is performed. Specifically, the CPU 13 analyzes the shared data (the unique ID data, the figure ID data, the pose/clothing ID data, the series ID data, and the use ID data) of the tag 2 acquired in the above step 45 and sets a content that can be used. Then, the CPU 13 determines whether or not the content of which the use is allowed is included in contents already set to be capable of being used. If the determination is negative, the CPU 13 determines that a content is to be newly added, and the processing proceeds to the next step 47. If, on the other hand, the content of which the use is allowed is included in the contents already set to be capable of being used, or if a content that can be used cannot be set based on the shared data of the tag 2 acquired in the above step 45, the processing proceeds to the next step 51 (see FIG. 7).

In step 47, in accordance with the tag data acquired in the above step 45, the CPU 13 adds a content that can be used, and the processing proceeds to the next step. For example, the CPU 13 sets the new content that can be added according to the determination in the above step 46, to be capable of being used, thereby updating the content data D1c.

It should be noted that if the state of acquisition of a content is managed by the tag 2, the CPU 13 may perform the process of generating transmission data indicating that a new content is acquired, and transmitting the transmission data to the tag 2. In this case, a content acquired flag data is set in the readable/writable area 22 (for example, the update data D2h) of the tag 2. Thus, the tag 2 sets the content acquired flag to on based on the transmission data from the information processing apparatus 1 and stores the content acquired flag. Further, if the state of acquisition of a content using the tag 2 is managed by another apparatus, the CPU 13 may perform the process of generating transmission data indicating that a new content is acquired, and transmitting the transmission data to another apparatus.

Next, the CPU 13 displays on the display section 17 an informing screen indicating to the user that a content is added (step 48), and the processing proceeds to step 51 (see FIG. 7). For example, the CPU 13 switches an upper screen shown in FIG. 4 to a lower screen, thereby informing the user that a new content (a clothes object for the character A in the example of FIG. 4) is added and becomes capable of being used.

Referring to FIG. 7, in step 51, the CPU 13 determines whether or not the content is to be acquired from the server. For example, the CPU 13 displays on the display section 17 an option indicating that a content is to be newly acquired from the tag, and an option indicating that a content is to be newly acquired from the server 3. Then, if the operation of selecting the option indicating that a content is to be newly acquired from the server is performed, the CPU 13 determines that the content is to be acquired from the server. Then, if a content is to be acquired from the server, the processing proceeds to step 52. If, on the other hand, the content is not to be acquired from the server, the processing proceeds to step 58.

In step 52, the CPU 13 performs the process of performing data communication with the server 3 via the network and determines whether or not it is possible to perform data communication with the server 3. For example, the CPU 13 controls the network communication section 18 and accesses the server 3. Then, if it is possible to perform data communication with the server 3, the processing proceeds to step 53. If, on the other hand, it is not possible to access the server 3, the CPU 13 repeats the process of step 52 and accesses the server 3 again. It should be noted that if the state where it is not possible to access the server 3 continues for a predetermined time or more after the operation of selecting the option indicating that a content is to be acquired from the server 3, the CPU 13 may display, on the display section 17, information indicating that data communication for accessing the server 3 times out. Then, the CPU 13 may return to the above step 42 and continue the process thereof.

In step 53, the CPU 13 transmits to the server 3 a request to acquire a content, together with the type of an application in which the content for which the acquisition request is made is used. Then, the CPU 13 acquires, from the server 3, data representing a content that can be newly acquired, and the processing proceeds to the next step. It should be noted that in the above step 53, based on the data acquired from the server 3, the CPU 13 displays, on the display section 17, options prompting the user to select a content to be acquired. Here, the user is informed that among contents that can be newly acquired, a paid-for content will be charged for when the content is acquired.

Next, if the user performs the operation of acquiring any one of the contents, and if the content is paid for, a charging process corresponding to the acquired content is performed for the user between the information processing apparatus 1 and the server 3 (step 54). It should be noted that the charging process may be performed by a known method, and is not described in detail here. If the charging process is completed, the processing proceeds to the next step.

Next, the CPU 13 acquires, from the server 3, data for acquiring the selected new content (step 55), and the processing proceeds to the next step. For example, in the charging process, the CPU 13 transmits to the server 3 a request to acquire the content selected by the user. Then, in response to the acquisition request, data for allowing the acquisition of the new content is transmitted from the server 3 and stored in the additional content data D1$b$. For example, the data to be transmitted from the server 3 may be data representing the newly acquired content per se (content data), or data for allowing the use of a content that is set to be incapable of being used in the application to be used, or data representing a password for allowing the use of the newly acquired content.

Next, in accordance with the data acquired from the server 3 in the above step 55, the CPU 13 adds a content that can be used (step 56), and the processing proceeds to the next step. For example, in accordance with the data acquired from the server 3 in the above step 55, the CPU 13 sets the new content to be capable of being used, thereby updating the content data D1$c$.

Next, the CPU 13 displays on the display section 17 an informing screen indicating to the user that a content is added (step 57), and the processing proceeds to step 58. For example, the CPU 13 switches the upper screen shown in FIG. 4 to the lower screen, thereby informing the user that a new content (a clothes object for the character A in the example of FIG. 4) is added and becomes capable of being used.

In step 58, the CPU 13 determines whether or not the game is to be started. For example, with reference to operation data acquired from the input section 16, if the user performs the operation of starting the game, using the input section 16, the CPU 13 determines that the game is to be started. Then, if the game is to be started, the processing proceeds to step 59. If, on the other hand, the game is not to be started, the CPU 13 returns to the above step 42 and repeats the process thereof.

In step 59, based on the managed content data, the CPU 13 performs game processing, and the processing proceeds to the next step. For example, the CPU 13 performs the process of advancing the game using a content set to be capable of being used in the content data D1$c$. It should be noted that in step 59, the user may select a content to be used. For example, a screen for prompting the user to select a content to be used in the game processing is displayed on the display section 17, and the use of a content selected in accordance with a user operation is allowed in the subsequent game processing.

Next, the CPU 13 determines whether or not the game is to be ended (step 60). In the above step 60, examples of conditions for ending the game include: the fact that the result of the above game is settled; and the fact that the user performs the operation of ending the game. If the game is not to be ended, the CPU 13 returns to the above step 59 and repeats the process thereof. If the game is to be ended, the CPU 13 ends the processing of the flow charts.

Second Exemplary Embodiment

Figure 8:
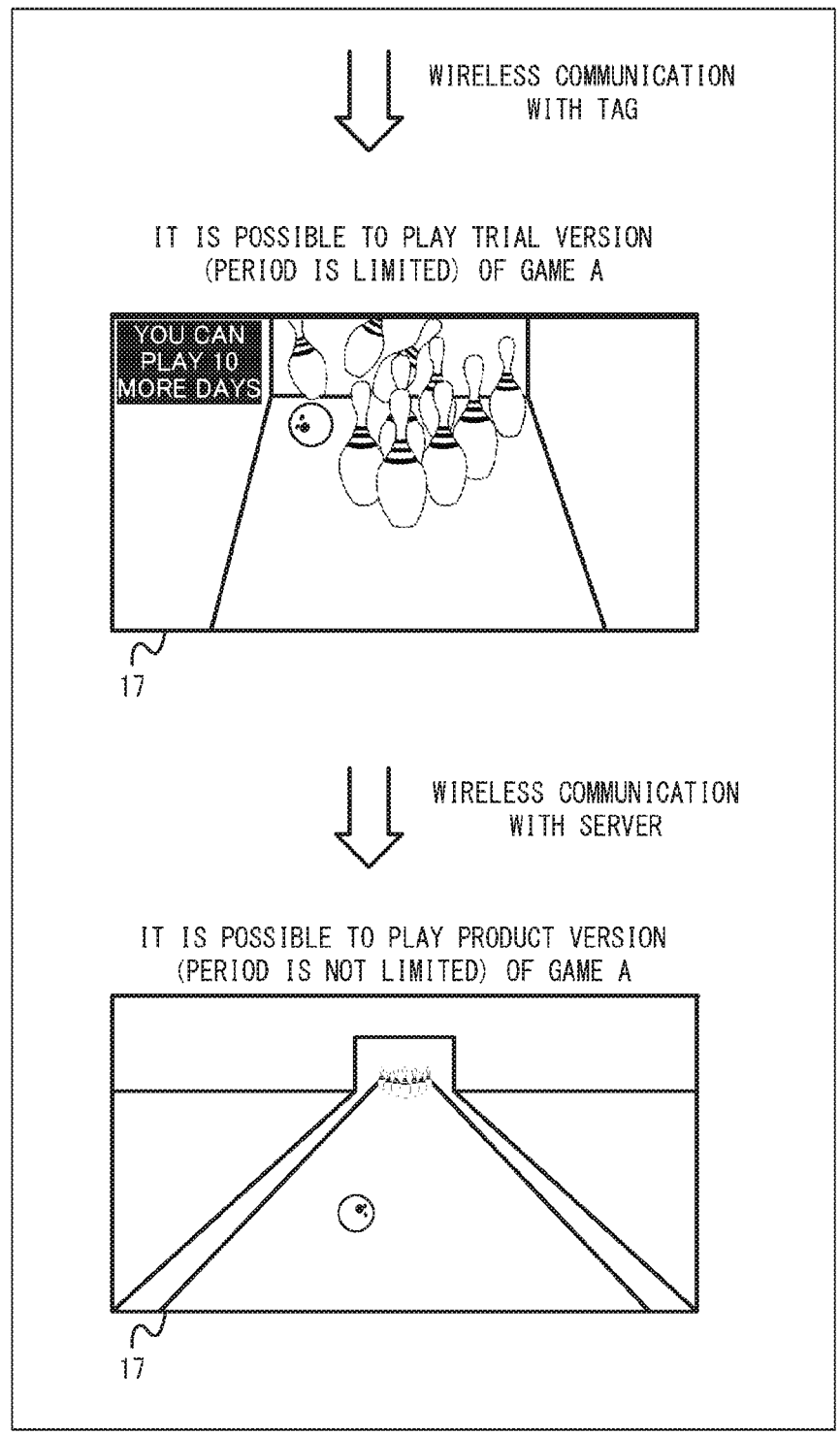
FIG. 8 is a diagram showing a non-limiting example of a display screen displayed on a display section 17 in information processing according to a second exemplary embodiment.

Next, with reference to FIG. 8, a description is given of a specific example of information processing according to a second exemplary embodiment. It should be noted that FIG. 8 is a diagram showing an example of a display screen displayed on the display section 17 in the information processing according to the second exemplary embodiment.

As shown in FIG. 8, in the exemplary embodiment, the same content having different usable periods can be acquired using a plurality of types of acquisition means. As an example, in the exemplary embodiment, a content that allows the execution of a predetermined application only for a predetermined period can be acquired using first acquisition means, and a content that allows the execution of the application with no period limitation can be acquired using second acquisition means.

In the example shown in FIG. 8, the information processing apparatus 1 performs near field communication with the tag 2, and thereby can execute a trial application (an application of which the usable period is limited) of a game A. The information processing apparatus 1 performs data communication with the server 3, and thereby can execute a product application (an application of which the usable period is not limited) of the same game A. In this case, a program of the application and data representing the usable period of the application may be stored in the read-only area 21 or the like of the tag 2, or may be pre-installed in advance in the program storage section 15 or the like of the information processing apparatus 1. In the following description, an example is used where the application program and data representing the usable period of the application program are stored in the tag 2. It should be noted that regarding the application of which the execution is allowed by the near field communication with the tag 2, once the execution is allowed, this execution-allowed state may continue after that until the usable period elapses, even if the information processing apparatus 1 is not performing near field communication with the tag 2. Alternatively, if the information processing apparatus 1 is not performing near field communication with the tag 2, the execution-allowed state may change to the state where the application cannot be executed.

For example, if the information processing apparatus 1 becomes able to perform near field communication with the tag 2, the information processing apparatus 1 reads a trial application program of the game A from the tag 2 and stores the application program. Then, after storing the application program, it is possible to play the game A in the information processing apparatus 1 until the usable period set for the application elapses. It should be noted that as will be apparent later, in the memory 14 of the information processing apparatus 1, a use limitation flag is set that indicates whether or not the above use limitation is valid or canceled. If the usable period elapses with the use limitation flag set to on, it is not possible to play the game A.

In the exemplary embodiment, to cancel the use limitation set for the trial application program, it is necessary to purchase a product application program of the game A. It is possible to acquire, from the server 3 via the network, a content that allows the execution of the application with no period limitation. For example, if the information processing apparatus 1 becomes able to communicate with the server 3, the information processing apparatus 1 requests, together with the type of an application used as a trial (that is, an application of the game A), the server 3 to acquire a product of the application. In response to the acquisition request, the server 3 presents to the request source the type of an application that can be acquired as a product by the information processing apparatus 1. Then, the information processing apparatus 1 displays on the display section 17 an image representing the type of a product application presented by the server 3, thereby prompting the user to make a purchase. Then, the information processing apparatus 1 transmits, to the server 3, data representing the type of a product application purchased in accordance with a purchase operation. If a product application is purchased, the server 3 performs the process of charging the user having made the acquisition request, where necessary, and then transmits, to the information processing apparatus 1 as the request source, data for canceling the use limitation of the application. Such processing enables the information processing apparatus 1 to set the use limitation flag to off and execute the application of the game A with no use limitation.

It should be noted that in the above description, an example has been used where, when the information processing apparatus 1 accesses the server 3 to acquire a product application, a charging process is performed. Alternatively, the application may be able to be acquired free of charge. Yet alternatively, if a trial application is acquired using the tag 2, the application may be paid for. For example, if the user purchases a tag 2 per se and acquires a trial application using near field communication with the tag 2, it can be considered that the trial application is paid for due to the purchase of the tag 2.

In addition, in the above description, an example has been used where the information processing apparatus 1 performs near field communication with the tag 2, whereby it is possible to execute an application of which the usable period is limited, and the information processing apparatus 1 performs data communication with the server 3, whereby it is possible to execute the same application of which the usable period is not limited. The exemplary embodiment may not be such a form. For example, the form may be such that the information processing apparatus 1 performs data communication with the server 3, whereby it is possible to execute an application of which the usable period is limited, and the information processing apparatus 1 performs near field communication with the tag 2, whereby it is possible to execute the same application of which the usable period is not limited.

In addition, if the right of use of an application is acquired using near field communication with a tag 2, the number of times the right of use can be acquired from the tag 2 may be limited. As an example, application acquired flag data is set in the readable/writable area 22 (for example, the update data D2h) of the tag 2. If the right of use of an application is set in the information processing apparatus 1, an application acquired flag is set to on and stored. Then, if the application acquired flag of the tag 2 is on, a setting is made so that the process of acquiring the right of use of the application cannot be performed. This limits the acquisition of the right of use of the application to only once. It should be noted that similarly to the first exemplary embodiment, in another apparatus (for example, the server 3) capable of performing data communication with the information processing apparatus 1, application right-of-use acquisition information may be set for each tag 2, and the state of acquisition of the right of use of an application in the tag 2 may be managed through the data communication.

Figure 9:
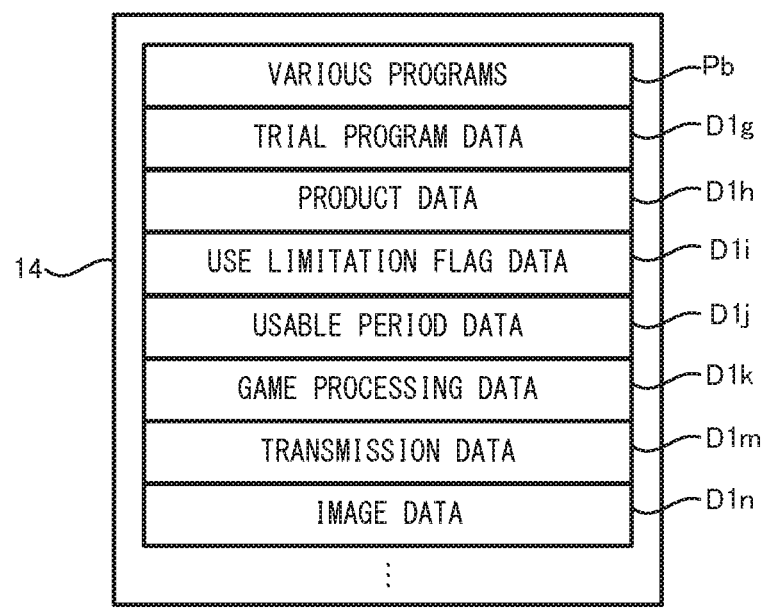
FIG. 9 is a diagram showing a non-limiting example of a data area set in a memory 14 of an information processing apparatus 1 in the second exemplary embodiment.
Figure 10:
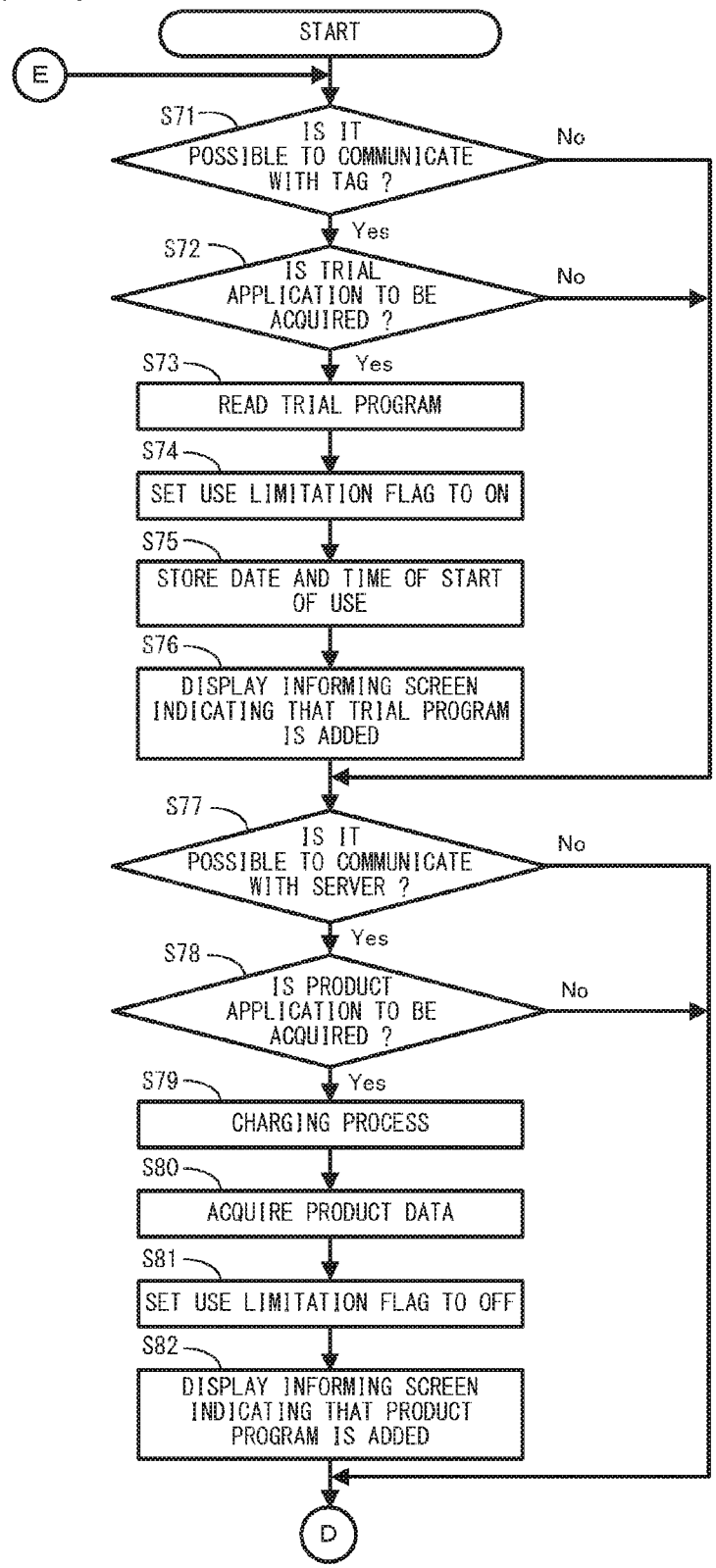
FIG. 10 is a flow chart showing a non-limiting example of the first half of information processing performed by the information processing apparatus 1 in the second exemplary embodiment.
Figure 11:
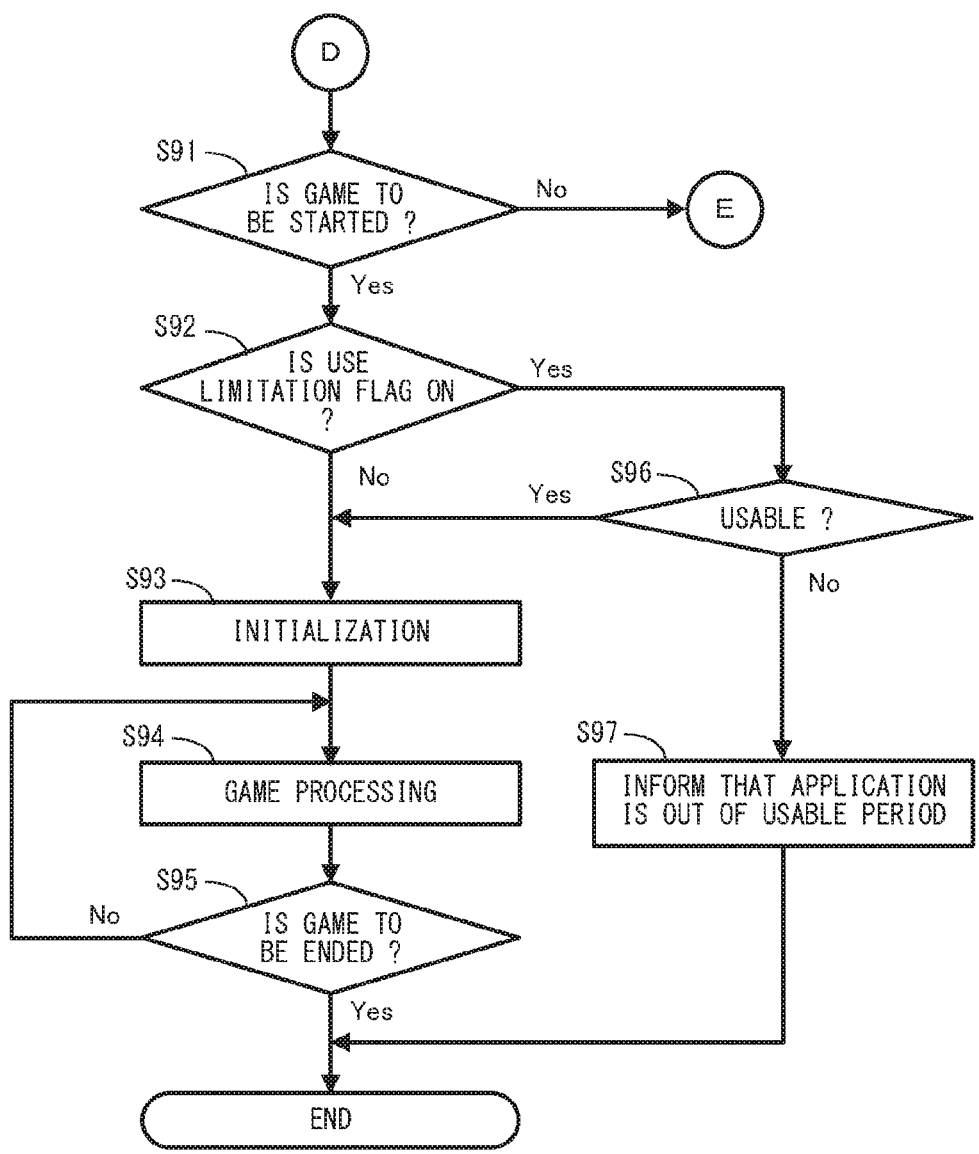
FIG. 11 is a flow chart showing a non-limiting example of the second half of the information processing performed by the information processing apparatus 1 in the second exemplary embodiment.

Next, with reference to FIGS. 9 to 11, a description is given of an example of specific processing performed by the information processing system (the information processing apparatus 1) in the exemplary embodiment. FIG. 9 is a diagram showing an example of a data area set in the memory 14 of the information processing apparatus 1 in the exemplary embodiment. It should be noted that the memory 14 stores, as well as data shown in FIG. 9, data used in other types of processing. The data, however, is not described in detail.

In a program storage area of the memory 14, various programs Pb to be executed by the information processing apparatus 1 are stored. In the exemplary embodiment, as the various programs Pb, the above communication program for performing near field communication, a content (an application program) acquired from the tag 2 or the server 3, and the like are stored. It should be noted that the various programs Pb may be stored in advance in the program storage section 15, or may be acquired from a storage medium attachable to and detachable from the information processing apparatus 1 and stored in the memory 14, or may be acquired from another apparatus via a network such as the Internet and stored in the memory 14. The CPU 13 executes the various programs Pb stored in the memory 14.

Further, in a data storage area of the memory 14, various types of data used in the communication process and the information processing to be performed by the information processing apparatus 1 are stored. In the exemplary embodiment, the following are stored in the memory 14: trial program data D1g; product data D1h; use limitation flag data D1i; usable period data D1j; game processing data D1k; transmission data D1m; image data D1n; and the like.

The trial program data D1g is an application program acquired from the tag 2 through near field communication, and may be stored in the program storage area of the memory 14 or the program storage section 15. The product data D1h is data regarding the cancellation of use limitation, which is acquired using data communication with the server 3, and may be a code or a password for canceling the use limitation, or may be product application program data per se. The use limitation flag data D1i is data representing a use limitation flag, which is set to on when a use limitation is set to valid when a predetermined application is executed. The usable period data D1j is data for calculating the elapsed time since the use of a trial application program is started. The game processing data D1k is data used to perform a game by executing an application. The transmission data D1m is data to be transmitted to the tag 2 or the server 3 when the above data communication process is performed. The image data D1n is data for displaying an image on the display section 17 when the above game is performed.

Next, a detailed example of information processing (game processing) in the exemplary embodiment is described. FIG. 10 is a flow chart showing an example of the first half of the information processing performed by the information processing apparatus 1 in the exemplary embodiment. FIG. 11 is a flow chart showing an example of the second half of the information processing performed by the information processing apparatus 1 in the exemplary embodiment. In the exemplary embodiment, a series of processes shown in FIGS. 10 and 11 is performed by the CPU 13 executing the communication program and a predetermined application program (a game program) included in the various programs Pb. It should be noted that the information processing shown in FIGS. 10 and 11 may be started at any timing. Further, in FIGS. 10 and 11, all the steps performed by the CPU 13 are abbreviated as "S".

It should be noted that the processes of all the steps in the flow charts shown in FIGS. 10 and 11 are merely illustrative. Thus, the processing order of the steps may be changed, or another process may be performed in addition to (or instead of) the processes of all the steps, so long as similar results are obtained. Further, in the present exemplary embodiment, a description is given on the assumption that the CPU 13 performs the processes of all the steps in the flow charts. Alternatively, a processor or a dedicated circuit other than the CPU 13 may perform the processes of some of the steps in the flow charts.

Referring to FIG. 10, the CPU 13 performs the process of receiving data from the tag 2 and determines whether or not it is possible to perform near field communication with the tag 2 (step 71). For example, the CPU 13 supplies power to an antenna (the near field communication section 11) for performing near field communication with the tag 2, thereby attempting to perform near field communication with an object (for example, the tag 2) placed near the antenna. Then, if it is possible to perform near field communication with the tag 2 via the antenna (the near field communication section 11), the processing proceeds to step 72. If, on the other hand, it is not possible to perform near field communication with the tag 2 via the antenna (the near field communication section 11), the processing proceeds to step 77.

In step 72, the CPU 13 determines whether or not a trial application is to be acquired from the tag 2. For example, the CPU 13 analyzes data in the read-only area 21 of the tag 2 having become able to communicate in the above step 71, and determines whether or not there is a trial application that can be acquired. Next, if there is a trial application that can be acquired, the CPU 13 displays on the display section 17 an option indicating that a trial application can be newly acquired. Then, if the operation of selecting the option is performed, the CPU 13 determines that a trial application is to be acquired from the tag 2. Then, if a trial application is to be acquired from the tag 2, the processing proceeds to step 73. If, on the other hand, a trial application is not to be acquired from the tag 2, the processing proceeds to step 77.

In step 73, the CPU 13 reads, via the antenna (the near field communication section 11), the trial application program stored in the tag 2 and data representing the usable period of the application and stores the trial application program and the data in the trial program data D1g. Then, the processing proceeds to the next step.

Next, the CPU 13 sets a use limitation flag regarding the application read in the above step 73 to on (step 74), and the processing proceeds to the next step. For example, if a use limitation flag is provided for each application, the CPU 13 sets the use limitation flag set for the application read in the above step 73 to on, thereby updating the use limitation flag data D1i.

Next, the CPU 13 stores the date and time of start of use (the current date and time) and the usable period of the application read in the above step 73 (step 75), and the processing proceeds to the next step. For example, the CPU 13 updates the usable period data D1j using data representing the current date and time and the data representing the usable period acquired from the tag 2.

Next, the CPU 13 displays on the display section 17 an informing screen indicating to the user that the trial application is added and becomes capable of being used (step 76), and the processing proceeds to step 77.

In step 77, the CPU 13 performs the process of performing data communication with the server 3 via the network and determines whether or not it is possible to perform data communication with the server 3. For example, the CPU 13 controls the network communication section 18 and accesses the server 3. Then, if it is possible to perform data communication with the server 3, the processing proceeds to step 78. If, on the other hand, it is not possible to access the server 3, the processing proceeds to step 91 (see FIG. 11).

In step 78, the CPU 13 determines whether or not a product application is to be acquired from the server 3. For example, the CPU 13 transmits to the server 3 a request to acquire a product content of the trial application currently already acquired and acquires, from the server 3, data representing a product content that can be acquired. Next, the CPU 13 displays on the display section 17 an option indicating that a product application can be acquired. Then, if the operation of selecting the option is performed, the CPU 13 determines that a product application is to be acquired from the server 3. If a product application is to be acquired from the server 3, the processing proceeds to step 79. If, on the other hand, a product application is not to be acquired from the server 3, the processing proceeds to step 91 (see FIG. 11).

In step 79, if the user performs the operation of acquiring a product application, and if the application is paid for, a charging process corresponding to the acquired application is performed for the user between the information processing apparatus 1 and the server 3. It should be noted that the charging process may be performed by a known method, and is not described in detail here. If the charging process is completed, the processing proceeds to the next step.

Next, the CPU 13 acquires, from the server 3, product data for acquiring the selected product application (step 80), and the processing proceeds to the next step. For example, in the charging process, the CPU 13 transmits to the server 3 a request to acquire the product application selected by the user. Then, in response to the acquisition request, data for allowing the acquisition of the application is transmitted from the server 3 and stored in the product data D1h. For example, the data to be transmitted from the server 3 may be a code or a password for canceling the use limitation, or may be product application program data per se.

Next, the CPU 13 sets a use limitation flag regarding the application acquired in the above step 80 to off (step 81), and the processing proceeds to the next step. For example, the CPU 13 sets a use limitation flag set for the application read in the above step 80 to off, thereby updating the use limitation flag data D1i.

Next, the CPU 13 displays on the display section 17 an informing screen indicating to the user that the product application is added and becomes capable of being used (step 82), and the processing proceeds to step 91 (see FIG. 11).

Referring to FIG. 11, in step 91, the CPU 13 determines whether or not a game is to be started. For example, with reference to operation data acquired from the input section 16, if the user performs the operation of starting a game, using the input section 16, the CPU 13 determines that a game is to be started. Then, if a game is to be started, the processing proceeds to step 92. If, on the other hand, a game is not to be started, the CPU 13 returns to the above step 71 and repeats the process thereof.

In step 92, the CPU 13 determines whether or not a use limitation flag set for the application of the game to be started is set to on. Then, if the use limitation flag of the application set in the use limitation flag data D1$i$ is set to off, the processing proceeds to step 93. If, on the other hand, the use limitation flag of the application set in the use limitation flag data D1$i$ is set to on, the processing proceeds to step 96.

In step 93, the CPU 13 performs game processing based on the trial application program or the product application program that can be executed, and the processing proceeds to the next step.

Next, the CPU 13 determines whether or not the game is to be ended (step 95). In the above step 95, examples of conditions for ending the game include: the fact that the result of the above game is settled; and the fact that the user performs the operation of ending the game. If the game is not to be ended, the CPU 13 returns to the above step 94 and repeats the process thereof. If the game is to be ended, the CPU 13 ends the processing of the flow charts.

If, on the other hand, it is determined in the above step 92 that the use limitation flag is set to on, the CPU 13 determines whether or not the application of the game to be started can be used (step 96). For example, with reference to the usable period data D1$j$, the CPU 13 acquires the date and time of start of use and the usable period and determines whether or not the current moment is within the usable period. Then, if the application of the game to be started can be used, the processing proceeds to step 93. If, on the other hand, the application of the game to be started cannot be used, the processing proceeds to step 97.

In step 97, the CPU 13 displays on the display section 17 an informing screen indicating to the user that the application of the game to be started is out of the usable period, and the game cannot be started. Then, the processing of the flow charts is ended.

In addition, in the above exemplary embodiment, an example has been used where, when the information processing apparatus 1 and the tag 2 perform near field communication with each other, the information processing apparatus 1 functions as an initiator-side wireless communication apparatus for causing the tag 2 to develop an electromotive force by electromagnetic induction, and the tag 2 functions as a wireless communication apparatus as a target of the information processing apparatus 1 when near field communication is performed. Alternatively, the near field communication may be performed in another form. For example, the tag 2 may be a device having a power supply and an NFC card emulation function, and only the tag 2 or both the information processing apparatus 1 and the tag 2 may be a device having a card emulation function.

In addition, the above exemplary embodiment has used, as an example, near field communication (proximity-type contactless communication) for bringing the information processing apparatus 1 and the tag 2 into proximity to each other to perform wireless communication based on the NFC standard. Alternatively, the exemplary embodiment may be applied to an information processing system where near field communication is performed based on other standards. For example, the exemplary embodiment can be applied also to an information processing system for performing wireless communication at a communication distance classified into a vicinity type, a remote type, a short distance type, or the like as well as the proximity type in contactless near field communication. Further, each of the information processing apparatus 1 and the communication terminal apparatus 2 may be any apparatus. For example, each of the information processing apparatus 1 and the tag 2 may be a stationary game apparatus, a mobile game apparatus, a general personal computer, any mobile electronic device (a PDA (Personal Digital Assistant), a mobile phone, a personal computer, a camera, or the like), or the like, or may be an information processing system for performing wireless communication by the combination of an apparatus and an electronic key.

In addition, the above descriptions have been given using an example where the information processing apparatus 1 and the tag 2 each perform a communication process and information processing. Alternatively, another apparatus may perform at least some of the processing steps. For example, if the information processing apparatus 1 is further configured to communicate with another apparatus (e.g., another server, another image display apparatus, another game apparatus, or another mobile terminal), the other apparatus may cooperate to perform the processing steps of the processing. Another apparatus may thus perform at least some of the processing steps, which enables processing similar to that described above. Further, the communication process and the information processing described above can be performed by a processor or the cooperation of a plurality of processors, the processor or the plurality of processors included in an information processing system including at least one information processing apparatus. Further, in the above exemplary embodiment, a communication process and information processing can be performed by the CPU 13 of the information processing apparatus 1 executing a predetermined program. Alternatively, part or all of the processing of the flow charts may be performed by a dedicated circuit included in the information processing apparatus 1.

Here, the above variations make it possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

In addition, the processing orders, the setting values, the conditions used in the determinations, and the like that are used in the information processing described above are merely illustrative. Thus, it goes without saying that the exemplary embodiment can be achieved also with other orders, other values, and other conditions.

In addition, the above program may be supplied to the information processing apparatus 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as, for example, an information processing system, an information processing apparatus, an information processing program, an information processing method, and the like in order, for example, to acquire a content using a plurality of types of means.

What is claimed is:

1. An information processing system including a server and an information processing apparatus,
    the information processing apparatus comprising a near field communications interface configured to use near field communications to acquire data, a network communications interface configured to acquire data from the server via a network, and a computer processor configured to:
        as first data acquisition, acquire selected data from the server via the network;
        as second data acquisition, perform near field communication with a non-transitory information storage medium to thereby acquire data from the information storage medium;
        execute an application in which a selected-content can be used;
        when data is acquired from the server in the first data acquisition, allow use of the selected content in the application based on the data acquired in the first data acquisition; and
        when data is acquired from the non-transitory information storage medium in the second data acquisition, allow use of a content in the same application based on the data acquired in the second data acquisition.

2. The information processing system according to claim 1, wherein
    allowing use of the content in the same application based on the data acquired in the second data acquisition comprises based on the data acquired in the second data acquisition, allowing use of a content stored in advance in the information processing apparatus, or by reading data representing the content from the information storage medium in the second data acquisition.

3. The information processing system according to claim 1, wherein
    the server comprises a computer processor configured to in accordance with a request from the information processing apparatus to allow use of the selected content, perform a process of charging a user of the information processing apparatus in accordance with the selected content.

4. The information processing system according to claim 1, wherein
    the computer processor of the information processing apparatus is further configured to prompt the user to select content from among a plurality of contents, and
    the application is executed using the selected content selected from among the plurality of contents.

5. The information processing system according to claim 4, wherein
    the selected content the use of which is allowed based on the data-acquired in the first data acquisition and the content the use of which is allowed based on data acquired in the second data acquisition are displayed together in a list on a display apparatus, thereby prompting a user to select a content from among contents displayed in the list.

6. The information processing system according to claim 4, wherein
    the selected content the use of which is allowed based on the data acquired in the first data acquisition and the content the use of which is allowed based on the data acquired in the second data acquisition are displayed on a display apparatus by distinguishing the contents, thereby prompting a user to select a content from among displayed contents.

7. The information processing system according to claim 1, wherein
    a content belonging to a content group of the same type that can be used in the application can be used.

8. The information processing system according to claim 7, wherein
    the same content that can be used in the application can be used.

9. The information processing system according to claim 1, wherein
    the selected content that can be used based on the data acquired in the first data acquisition and the content that can be used in the same application based on the data acquired in the second data acquisition are contents belonging to content groups of different types that can be used in the application.

10. The information processing system according to claim 1, wherein
the server comprises a computer processor configured to in accordance with a request from the information processing apparatus, present contents that can be used by the information processing apparatus, and
the computer processor of the information processing apparatus is further configured to based on the presented contents, prompt a user to select a content, and using the content selected by the user.

11. The information processing system according to claim 1, wherein
the information storage medium has an external appearance related to a predetermined character, and
the content related to the character is used based on information from the information storage medium.

12. The information processing system according to claim 11, wherein
the information storage medium stores as the information an identification code regarding the character.

13. The information processing system according to claim 1, wherein
the information processing apparatus further comprises a content storage configured to store at least the content the use of which is allowed based on the data acquired in the second data acquisition, and
even in a state where the information processing apparatus cannot perform the near field communication with the information storage medium, the application can be executed using the content stored in the content storage.

14. An information processing system including a server and an information processing apparatus,
the information processing apparatus comprising a near field communications interface configured to use near field communications to acquire data, a network communications interface configured to acquire data from the server via a network, and a computer processor configured to:
as first data acquisition, acquire user-selected data from the server via the network;
as second data acquisition, perform near field communication with a non-transitory information storage medium, to thereby acquire data from the information storage medium;
execute an application in which a user-selected content can be used;
when data is acquired from the server in the first data acquisition, allow use of the user-selected content in the application based on the data acquired in the first data acquisition; and
when data is acquired from the non-transitory information storage medium in the second data acquisition, allow use of a content in the same application based on the data acquired in the second data acquisition.

15. An information processing apparatus capable of performing data communication with a server, the information processing apparatus comprising a near field communications interface configured to use near field communications to acquire data, a network communications interface configured to acquire data from the server via a network, and a computer processor configured to:
as first data acquisition, acquire selected data from the server via the network;
as second data acquisition, perform near field communication with a non-transitory information storage medium, to thereby acquire data from the information storage medium;
execute an application in which a selected content can be used;
when data is acquired from the server in the first data acquisition, allow use of the selected content in the application based on the data acquired in the first data acquisition; and
when data is acquired from the non-transitory information storage medium in the second data acquisition, allow use of a content in the same application based on the data acquired in the second data acquisition.

16. A non-transitory computer-readable storage medium having stored therein an information processing program to be executed by a computer included in an information processing apparatus capable of performing data communication with a server via a network, the information processing apparatus comprising a near field communications interface configured to use near field communications to acquire data, the information processing program causing the computer to execute:
acquiring user-selected data from the server via the network;
performing near field communication with non-transitory information storage medium, to thereby acquire data from the information storage medium;
executing an application in which a selected content can be used;
based on the user-selected data acquired from the server via the network, allowing use of the selected content in the application when data is acquired from the server; and
based on the data acquired from the information storage medium through the near field communication, allowing use of a content in the same application when data is acquired from the non-transitory information storage medium.

17. An information processing method to be performed by a processor or cooperation of a plurality of processors, the processor or the plurality of processors included in an information processing system including a server and an information processing apparatus comprising a near field communications interface configured to use near field communications to acquire data, and a network communications interface configured to acquire data from the server via a network, the information processing method comprising:
acquiring selected data from the server via the network;
performing near field communication with a non-transitory information storage medium, to thereby acquire data from the information storage medium;
executing an application in which a selected content can be used;
when data acquired from the server via the network, allowing use of the selected content in the application based on the data acquired from the server; and
when data is acquired from the non-transitory information storage medium through the near field communication, allowing use of a content in the same application based on the data acquired from the non-transitory information storage medium.

18. An information processing apparatus capable of performing data communication with a server, the information processing apparatus comprising a near field communications interface configured to use near field communications to acquire data, a network communications interface configured to acquire data from the server via a network, and a computer processor configured to:
- as first data acquisition, acquire user-selected data from the server via the network;
- as second data acquisition, perform near field communication with a non-transitory information storage medium to thereby acquire data from the information storage medium;
- execute an application in which a user-selected content can be used;
- when data is acquired from the server in the first data acquisition, allow use of the user-selected content in the application based on the data acquired in the first data acquisition; and
- when data is acquired from the non-transitory information storage medium in the second data acquisition, allow use of a content in the same application based on the data acquired in the second data acquisition.

19. A non-transitory computer-readable storage medium having stored therein an information processing program to be executed by a computer included in an information processing apparatus capable of performing data communication with a server via a network and capable of using near field communications of a near field communications interface to acquire data, the information processing program causing the computer to execute:
- acquiring selected data from the server via the network;
- performing near field communication with a non-transitory information storage medium to acquire data from the information storage medium;
- execute an application in which a selected content can be used;
- when data is acquired from the server via the network, allow use of the selected content in the application based on the data acquired from the server; and
- when data is acquired from the non-transitory information storage medium through the near field communication, allow use of a content in the same application based on the data acquired through the near field communication.

20. An information processing method to be performed by a processor or cooperation of a plurality of processors, the processor or the plurality of processors included in an information processing system including a server and an information processing apparatus comprising (a) a near field communications interface configured to use near field communications to acquire data and (b) a network communications interface configured to acquire data from the server via a network, the information processing method comprising:
- acquiring selected data from the server via the network;
- performing near field communication with a non-transitory information storage medium to acquire data from the information storage medium;
- execute an application in which a selected content can be used;
- when data is acquired from the server via the network, allowing use of the selected content in the application based on the data acquired from the server; and
- when data is acquired from the non-transitory information storage medium through the near field communication, allowing use of a content in the same application based on the data acquired through the near field communication.

* * * * *